United States Patent
Rodgers

(10) Patent No.: US 7,222,873 B2
(45) Date of Patent: May 29, 2007

(54) TOW HOOK HITCH ASSEMBLY

(76) Inventor: E. Walter Rodgers, 5650 W. Marconi, Glendale, AZ (US) 85306

( * ) Notice: Subject to any disclaimer, the term of this patent is extended or adjusted under 35 U.S.C. 154(b) by 0 days.

(21) Appl. No.: 11/009,929

(22) Filed: Dec. 10, 2004

(65) Prior Publication Data

US 2005/0104325 A1   May 19, 2005

Related U.S. Application Data

(63) Continuation-in-part of application No. 10/657,478, filed on Sep. 8, 2003, now Pat. No. 6,902,183.

(51) Int. Cl.
*B60D 1/14*    (2006.01)
*B60D 1/167*   (2006.01)

(52) U.S. Cl. .............. 280/495; 280/494; 280/501; 280/502; 280/482; 280/415.1; 280/416.1; 280/500; 248/226.11; 248/228.5; 248/231.61; 248/231.85; 248/24.8

(58) Field of Classification Search ............... 280/494, 280/500, 501, 502, 482, 415.1, 416.1; 248/226.11, 248/228.5, 231.61, 231.85, 24.8
See application file for complete search history.

(56) References Cited

U.S. PATENT DOCUMENTS

| | | | | |
|---|---|---|---|---|
| 1,816,121 A | * | 7/1931 | McLamarrah | 267/138 |
| 2,039,689 A | * | 5/1936 | Tade | 280/500 |
| 2,444,876 A | * | 7/1948 | Kuhl | 280/495 |
| 2,486,161 A | * | 10/1949 | Hughes | 280/502 |
| 4,714,265 A | | 12/1987 | Franklin | 280/491 |
| 4,836,570 A | * | 6/1989 | Lopez et al. | 280/507 |
| 5,000,473 A | * | 3/1991 | Johnson | 280/491.1 |
| 5,054,806 A | | 10/1991 | Chester | 280/495 |
| 5,088,754 A | | 2/1992 | Skelton | 280/491.3 |
| 5,147,095 A | | 9/1992 | Duncan | 280/491.4 |
| 5,150,911 A | | 9/1992 | Williams | 280/502 |
| 5,716,066 A | | 2/1998 | Chou | 280/501 |
| 5,727,806 A | | 3/1998 | McCoy et al. | 280/494 |
| 5,755,454 A | | 5/1998 | Peterson | 280/491.1 |
| 6,283,490 B1 | | 9/2001 | Sciannanteno et al. | 280/493 |
| 6,457,733 B1 | | 10/2002 | Hansen | 280/481 |
| 6,457,734 B1 | | 10/2002 | Hansen | 280/481 |
| 6,672,609 B2 | | 1/2004 | Pierman et al. | 280/504 |
| 6,685,212 B1 | | 2/2004 | Penlerick et al. | 280/495 |

(Continued)

FOREIGN PATENT DOCUMENTS

DE    10041063    5/2001

OTHER PUBLICATIONS

Roadmaster Internet Web Page archived Feb. 19, 2004; www.roadmaster-tow-bars.com, bracket types.

*Primary Examiner*—Lesley D. Morris
*Assistant Examiner*—Marlon Arce-Diaz
(74) *Attorney, Agent, or Firm*—Cahill, von Hellens & Glazer, PLC

(57) ABSTRACT

A tow hook hitch assembly attaches to one or both of the front tow hooks provided on a four wheel drive vehicle for mounting a tow ball, winch, or other accessory to the front end of the vehicle. The tow hook hitch includes an upper member extending above the tow hook, a lower member extending below the tow hook, a shaped insert secured to the upper member or lower member for extending within the tow hook, and a clamp bolt for securing the aforementioned components together.

20 Claims, 10 Drawing Sheets

U.S. PATENT DOCUMENTS 6,729,639 B2 * 5/2004 Tomita ........................ 280/495
6,742,799 B1   6/2004 Hansen ....................... 280/495
2004/0090041 A1 5/2004 Lenzen et al. ........... 280/491.5

* cited by examiner

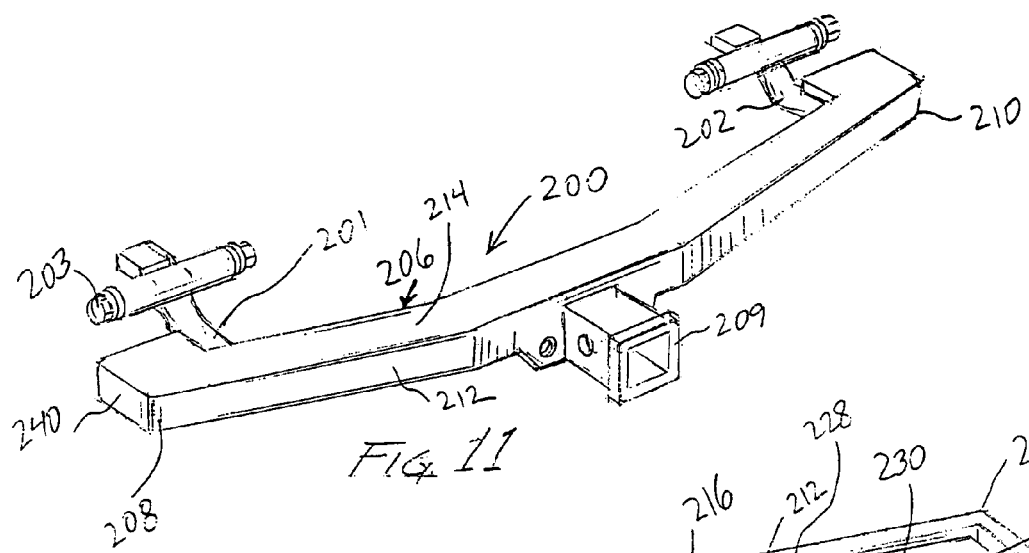
FIG. 11
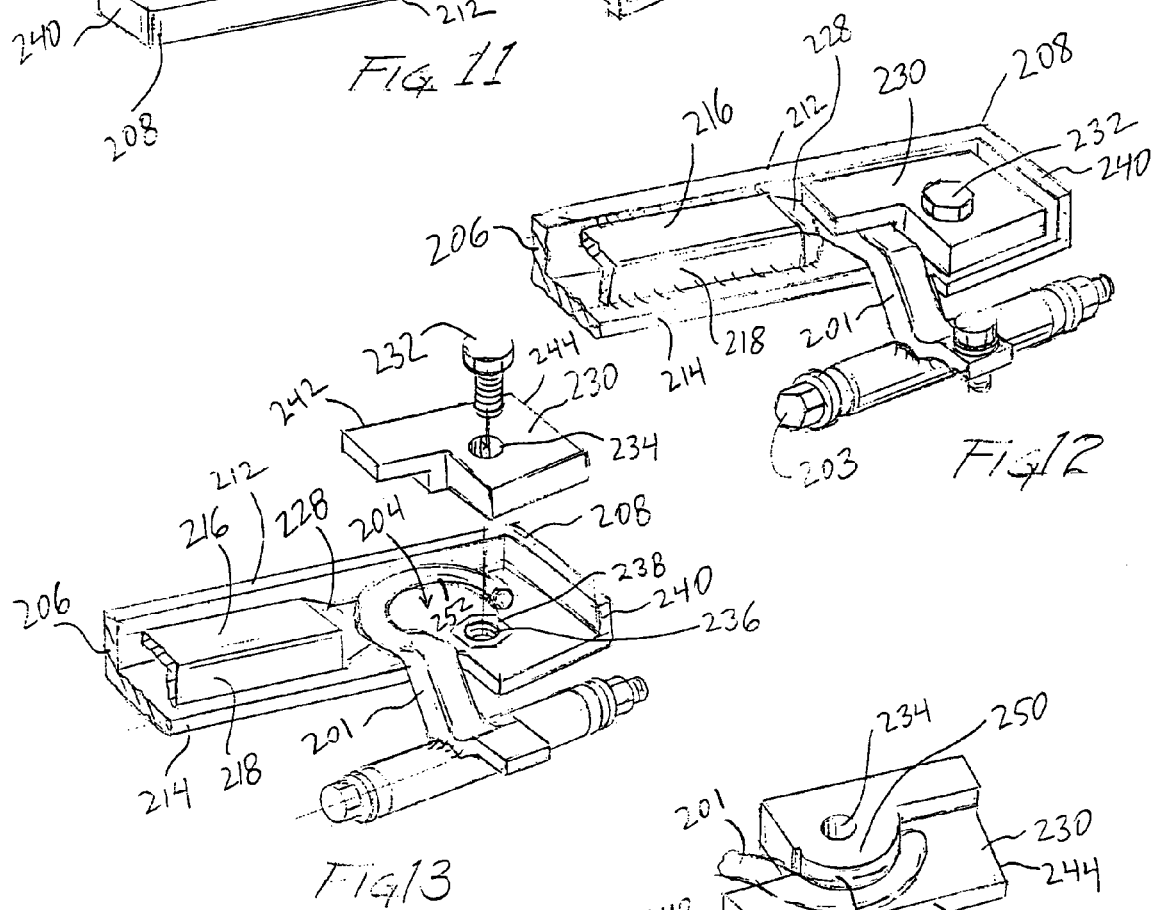
FIG. 12
FIG. 13
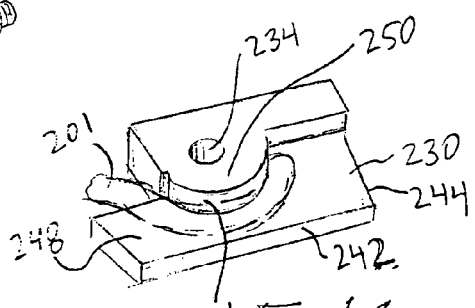
FIG. 14
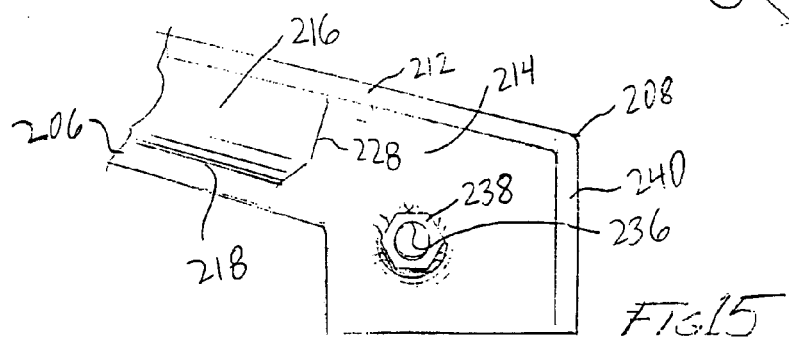
FIG. 15

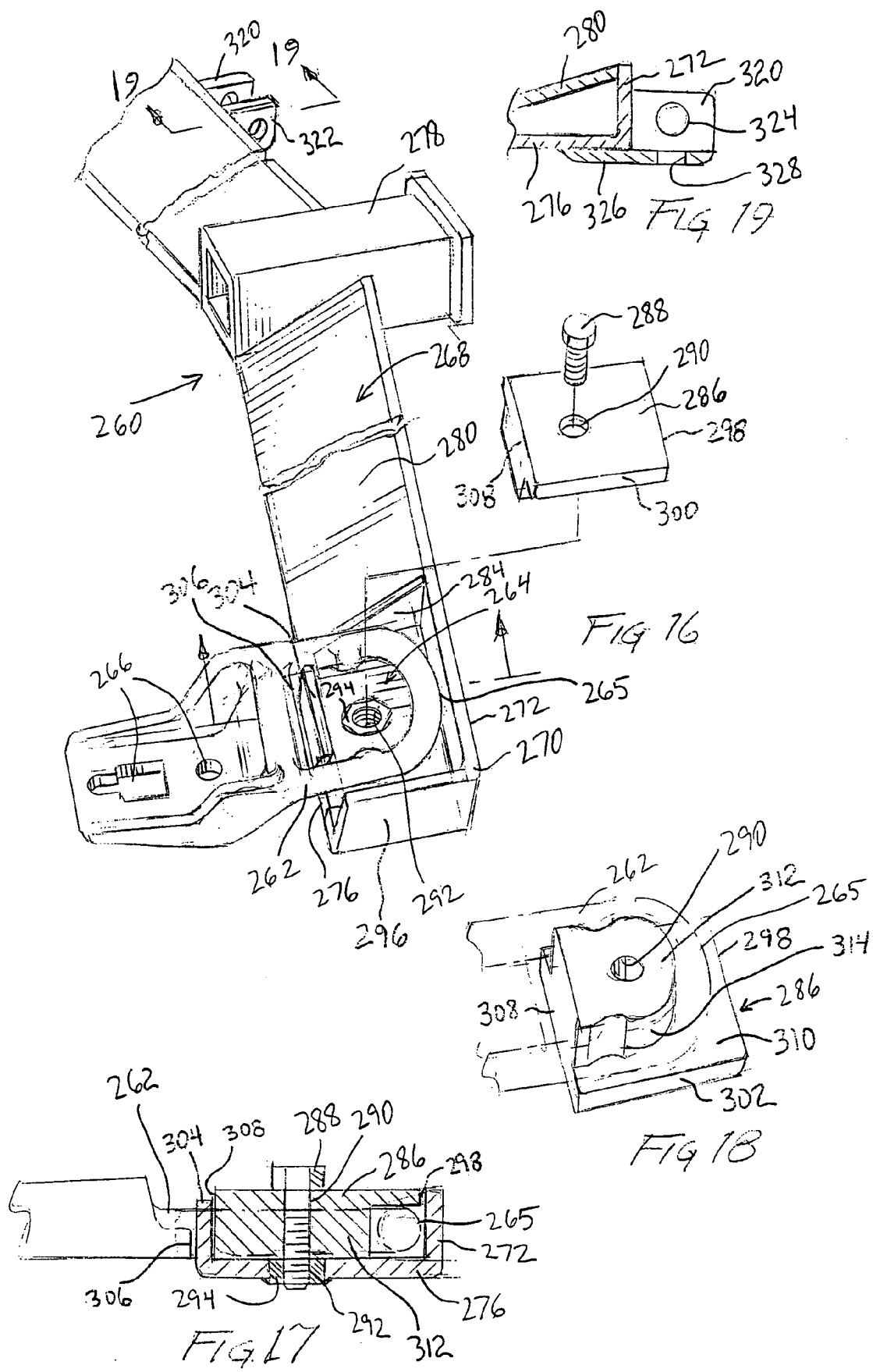

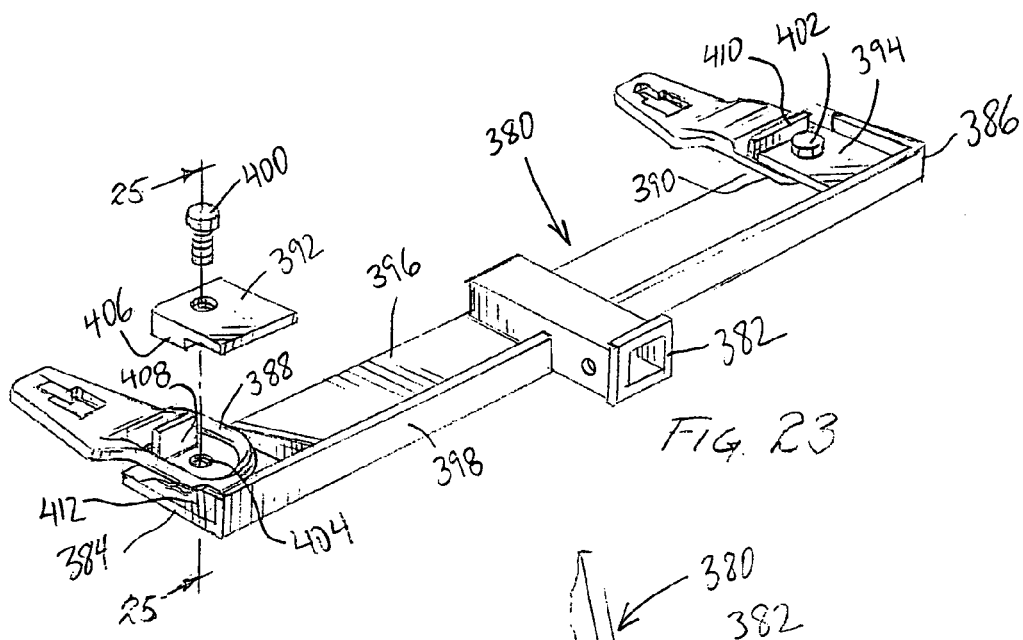
FIG. 23
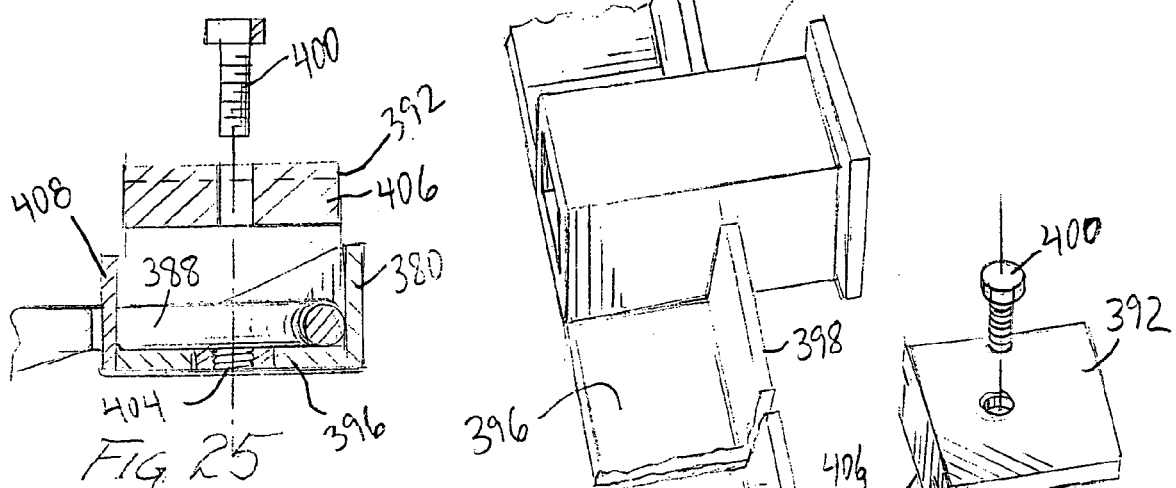
FIG. 25
FIG. 24
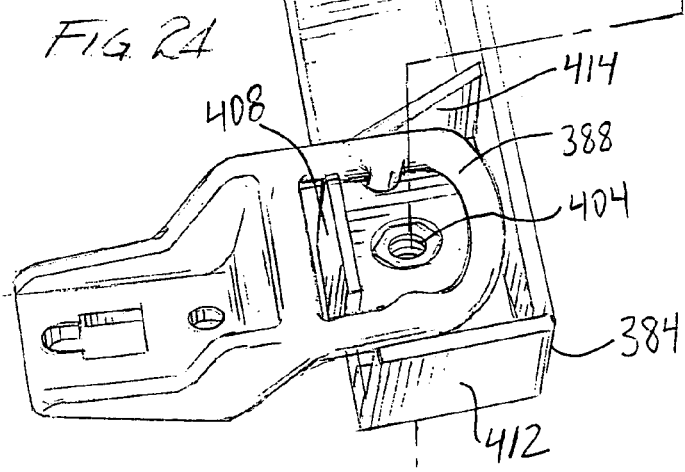

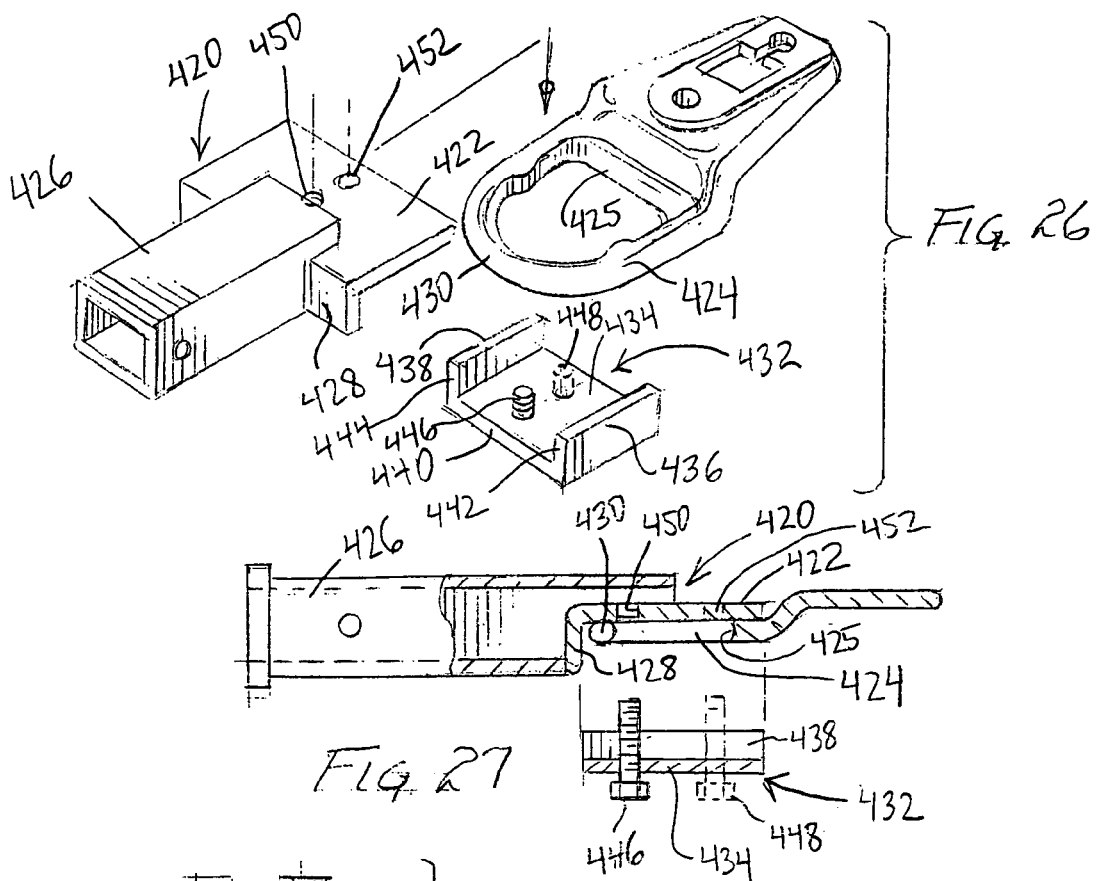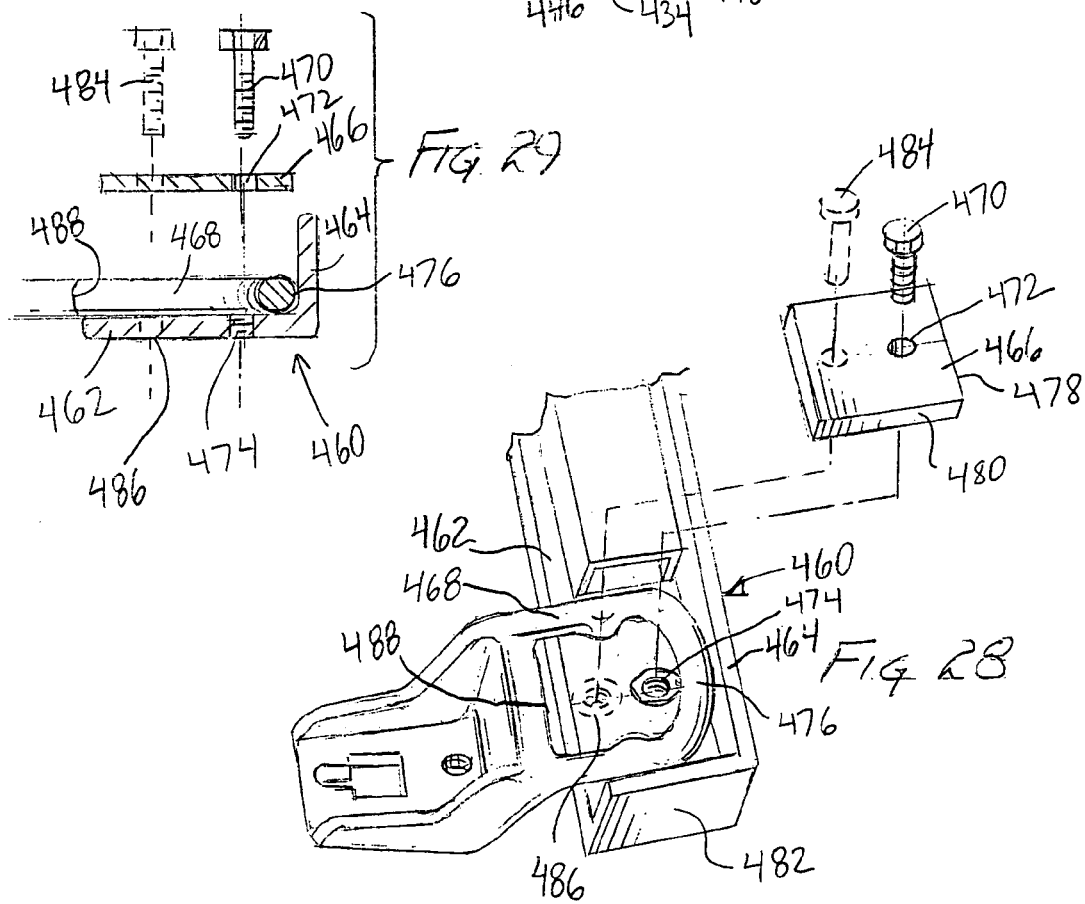

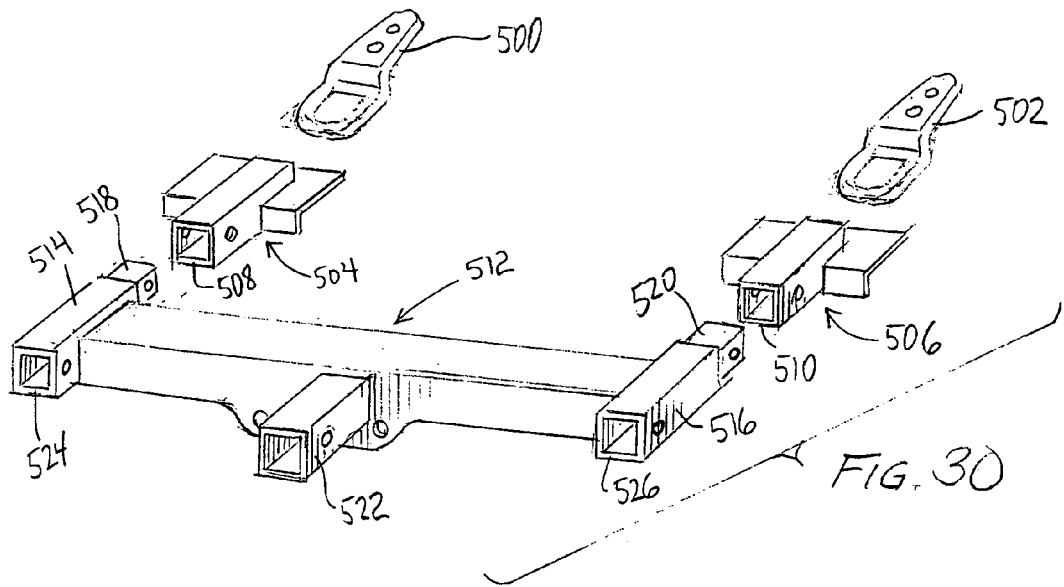
FIG. 30
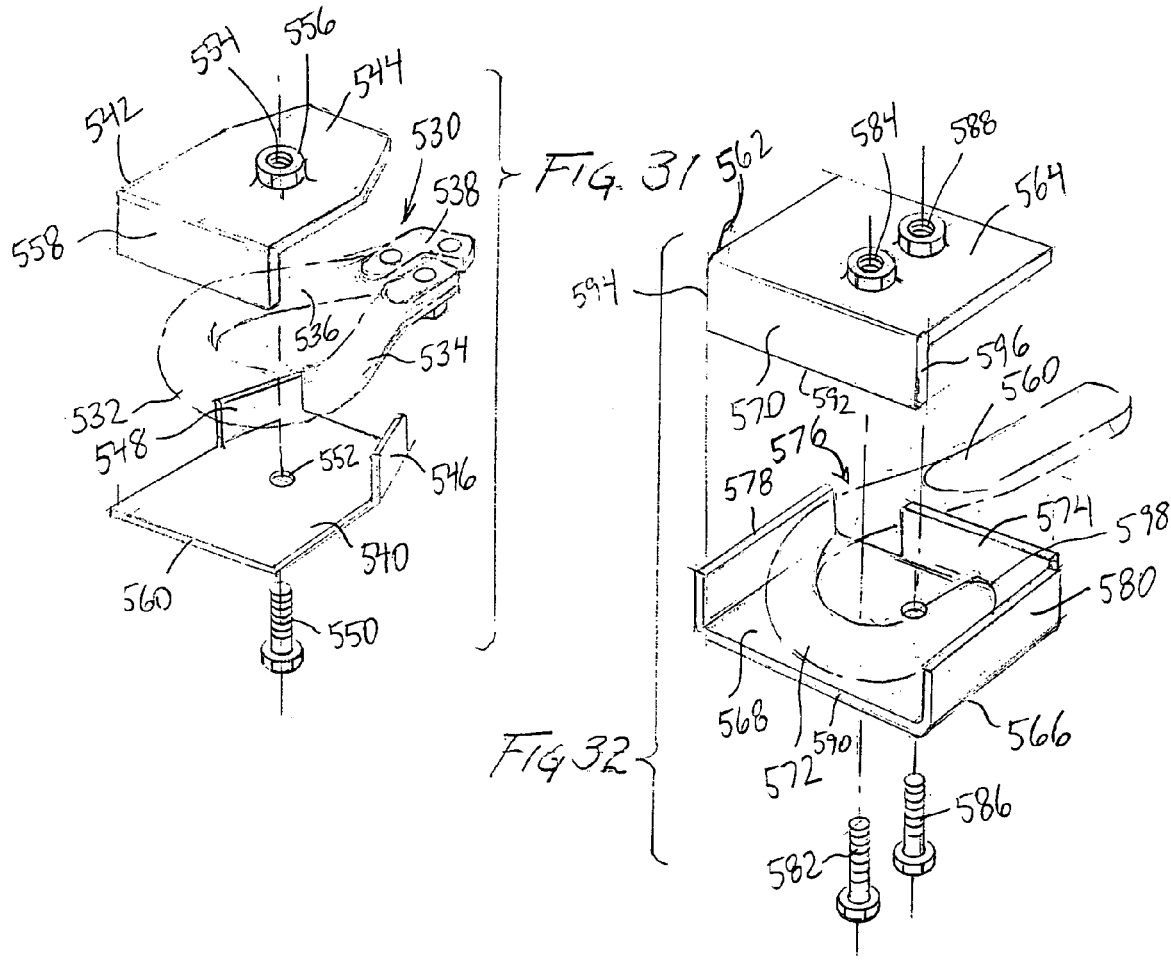
FIG. 31
FIG. 32

TOW HOOK HITCH ASSEMBLY

CROSS-REFERENCE TO RELATED PATENT APPLICATION

The present application is a continuation-in-part of parent patent application Ser. No. 10/657,478, filed on Sep. 8, 2003 now U.S. Pat. No. 6,902,183, and the Applicant hereby claims the benefit of the filing date of such earlier-filed application under 35 U.S.C. §120.

BACKGROUND OF THE INVENTION

1. Field of the Invention

This invention relates to a tow hook hitch assembly and method for securely mounting a hitch assembly to one or both tow hooks provided on the front end of a vehicle.

2. Description of the Related Art

Four wheel drive vehicles, including pickup trucks and sport utility vehicles, are often provided with a pair of front tow hooks extending through, or just below, the front bumper of the vehicle. In some cases, a pair of rear tow hooks are also provided. Such tow hooks are typically used to pull the vehicle out of rough, muddy, or snowy terrain after the vehicle has become stuck. A chain, cable or strap can be coupled to the tow hooks of the disabled vehicle and extended to another towing vehicle to help pull the disabled vehicle out of such terrain.

In the past, owners of four wheel drive vehicles have often desired to mount a motorized winch to the front of their vehicles. However, the front bumpers equipped by the manufacturer of the vehicle often interfered with the attachment of such winches to the vehicle. Accordingly, the vehicle owner would typically need to replace the original front bumper with a replacement that would accommodate a winch, often at significant expense.

Those skilled in the art have also disclosed the use of such tow hooks for other purposes. For example, in U.S. Pat. Nos. 4,457,733 and 4,457,734, both issued to Hansen, a front hitch assembly is disclosed whereby the front left and right tow hooks of a vehicle are used to releasably mount a center trailer hitch type receiver on the front end of the vehicle. This center receiver can then be used to support a winch, a bicycle rack, or a towing hitch ball. The Hansen front hitch assembly includes an elongated frame member having openings at its ends for receiving the left and right tow hooks of the vehicle. A horizontal surface of the frame member rests upon the upper surfaces of the tow hooks. Left and right threaded bolts are engaged with the frame member at its opposing ends. Each bolt is tightened until the end of the bolt directly contacts the underside of its associated tow hook. In this manner, the bolt effectively pulls the horizontal surface of the frame member downwardly against the upper surface of the tow hook.

The Hansen tow hook attachment method described above suffers from several disadvantages. First, because it is only the end portion of each tightening bolt that actually contacts the lower surface of the tow hook, the tow hook can not be reliably wedged between the horizontal surface of the frame member and the end of the tightening bolt. This is particularly true if vertical loading having a twisting moment is applied to the frame member. Secondly, some of the tow hooks that are provided on such vehicles are made of relatively soft aluminum, and the tightening of the end of Hansen's attachment bolt into an aluminum tow hook will wear away the tow hook. Thirdly, while Hansen's attachment method may limit vertical (i.e., upward and downward) movement of the frame member relative to the tow hook, Hansen's attachment method does not limit lateral rotational movement of the frame member relative to the tow hook. This fact may not present a problems when the frame member is attached to both left and right tow hooks in the manner already described, but it does present a problem if it were desired to attach the frame member to only a single tow hook. The tow hitch assembly disclosed by Hansen must be attached to both tow hooks before it can be used.

Certain Y-shaped towing bars are known in the automotive trade for allowing one vehicle to tow a second vehicle. Examples of such towing bars are disclosed in U.S. Pat. No. 5,727,806 to McCoy, at al. and in U.S. Pat. No. 5,147,095 to Duncan. These towing bars are generally attached to a vehicle to be towed by engaging left and right ends of the towing bar with brackets secured to the frame of the vehicle to be towed. However, such towing bars are not generally adapted to engage tow hooks extending from the front end of a truck.

U.S. Pat. No. 6,685,212 to Penlerick, et al. discloses a combination tow hook and base plate system for connecting a tow bar to a towed vehicle having closed-loop tow hooks. A pair of base plate members are positioned below a respective pair of closed-loop tow hooks. The base plate members are connected by a telescoping adjustable cross member. A connector plate is positioned above each of the closed-loop tow hooks, and bolts and mating fastening nuts are used to secure the closed-loop tow hooks between their respective base plate members and connector plates. A spacer is inserted inside each closed-loop tow hook between the respective base plate member and connector plate. A tow bar bracket extends forwardly from each base plate member for receiving a leg of a Y-shaped tow bar. No accommodation is made for open J-shaped tow hooks.

None of the foregoing hitch assemblies provides a secure, non-twisting connection between a vehicle tow hook and the mechanism used to make attachment thereto. In addition, none of the foregoing hitch assemblies is flexible enough to allow for the alternative use of a Y-shaped tow bar or a conventional, center-mounted towing hitch ball.

Accordingly, it is an object of the present invention to provide a tow hitch assembly and method for mounting a tow hitch to a tow hook in a secure and sturdy manner.

It is another object of the present invention to provide a tow hook hitch assembly and method for mounting a tow hitch to either one or two tow hooks provided on a vehicle.

It is yet another object of the present invention to provide a tow hook hitch assembly which may be used with different types of hooks, including "U" and "J" shaped hooks, and which is-easy to install, and easy to remove.

Still another object of the present invention is to provide a tow hitch assembly that achieves a secure, non-twisting connection between a vehicle tow hook and the mechanism used to make attachment thereto.

A further object of the present invention is to provide a tow hitch assembly that is flexible enough to permit the alternative use of a Y-shaped tow bar or a conventional, center-mounted towing hitch ball.

These and other objects of the present invention will become more apparent to those skilled in the art as the description of the present invention proceeds.

SUMMARY OF THE INVENTION

Briefly described, and in accordance with one embodiment thereof, the present invention relates to a tow hook hitch for attachment to first and second tow hooks of a vehicle, including an elongated frame member having a first end engaging the first tow hook and a second opposing end engaging the second tow hook. A first clamp plate is positioned proximate to the first tow hook opposite the first end of the elongated frame member on an opposing side of the first tow hook; likewise, a second clamp plate is positioned proximate to the second-tow hook opposite the second end of the elongated frame member on an opposing side of the second tow hook. A first attachment bolt extends through the hollow inner passage of the first tow hook for clamping the first tow hook between the first end of the elongated frame member and the first clamp plate; similarly, a second attachment bolt extends through the hollow inner passage of the second tow hook for clamping the second tow hook between the second end of the elongated frame member and the second clamp plate.

Preferably, the first and second ends of the elongated frame member include threaded holes for receiving the threaded ends of the first and second attachment bolts, respectively. These threaded holes can advantageously be provided by first forming a non-threaded hole in the elongated frame member, and then securing, as by welding, a nut with a threaded bore to the elongated frame member adjacent to, or within, the non-threaded hole to provide the threaded hole.

The elongated frame member may include a central region having a closed, hollow cross-sectional profile, e.g., a rectangular boxlike cross-section, or a triangular cross-section, as viewed perpendicular to the longitudinal axis of said elongated frame member for improved structural strength. Alternatively, the elongated frame member may include a generally horizontal wall extending along the longitudinal axis thereof, and at least one generally vertical wall extending along the longitudinal axis and joined to such horizontal wall; in this event, the first and second ends of the horizontal wall provide first and second clamp surfaces proximate the first and second ends of the elongated frame member, respectively, against which the first and second tow hooks may be clamped.

In each of the embodiments of the invention described above, the first and second clamp members preferably each include a boss for extending into the hollow inner passages of the first and second tow hooks. Each of such bosses preferably includes a sidewall, at least a portion of which generally conforms to, and abuts, the inner periphery of the tow hook in which it is inserted, to resist movement of each clamp member relative to its respective tow hook. The first and second attachment bolts preferably extend at least partially into said first and second bosses, respectively.

In each of the embodiments of the present invention described above, a further aspect of the present invention relates to the addition of a first end cap secured to the first end of the elongated frame member, and extending both generally perpendicular to the clamping surface at the first end of the elongated frame member, and at a substantial angle relative to the longitudinal axis of the elongated frame member. A second end cap may likewise be secured to the second end of the elongated frame member, and extending both generally perpendicular to the clamping surface at the second end of the elongated frame member, and at a substantial angle relative to the longitudinal axis thereof. The first clamp member can then abut both the first end cap and a generally-vertical wall to restrict rotational and lateral movement of the first clamp member relative to the elongated frame member. Likewise, the second clamp member can then abut both the second end cap and a generally-vertical wall to restrict rotational and lateral movement of the second clamp member relative to the elongated frame member.

To further stabilize the first and second clamp members, the aforementioned hitch assembly may also include first and second inboard support walls secured generally proximate to the first and second ends, respectively, of the elongated frame member but inset therefrom. These inboard support walls may either be in addition to, or in lieu of, the first and second end caps. The first inboard support wall extends generally perpendicular to the first clamping surface, and at a substantial angle relative to the longitudinal axis of the elongated frame member. Likewise, the second inboard support wall extends generally perpendicular to the second clamping surface, and at a substantial angle relative to the longitudinal axis of the elongated frame member. In this manner, the first clamp member abuts both the first inboard support wall and a generally vertical wall to restrict rotational and lateral movement of the first clamp member relative to the elongated frame member; likewise, the second clamp member abuts both the second inboard support wall and a generally-vertical wall to restrict rotational and lateral movement of the second clamp member relative to the elongated frame member.

Alternatively, to further stabilize the first and second clamp members, the hitch assembly of the present invention may include first and second tabs extending generally vertically from the first and second clamping surfaces of the elongated frame member, the first tab extending within the hollow inner passage of the first tow hook, and the second tab extending within the hollow inner passage of the second tow hook. In this event, the first clamp member abuts both the first tab and at least one generally vertical wall to restrict rotational and lateral movement of the first clamp member relative to said elongated frame member. Similarly, the second clamp member abuts both the second tab and said at least one generally vertical wall to restrict rotational and lateral movement of the second clamp member relative to the elongated frame member.

If desired, the aforementioned hitch assembly may further include a first pair of plates extending from the elongated frame member generally proximate to the first end thereof, each of such plates having a hole formed therethrough, with the holes formed in each of such plates being generally aligned with each other, forming a bracket for receipt of the first end of a tow bar or the like. A second such bracket may be provided generally proximate to the second end of the elongated frame member for receipt of the second end of a tow bar or the like.

Another aspect of the present invention relates to a tow hook hitch for attachment to first and second tow hooks of a vehicle including an elongated frame member having a first end for engaging the first tow hook and a second end for engaging the second tow hook, and wherein the first end of the elongated frame member includes a generally horizontal plate for engaging a face of the tow hook. A first generally-vertical wall extends generally-perpendicularly from the horizontal plate and lies proximate to the rounded front portion of the first tow hook. A second generally-vertical wall also extends generally-perpendicular from the horizontal plate and at a substantial angle, or lateral, to the first generally-vertical wall; this second generally-vertical lateral wall lies generally proximate to one side of the first tow hook. A clamp plate is positioned proximate to the first tow hook opposite the generally horizontal plate and proximate the opposing face of the first tow hook; the clamp plate includes a hook-clamping surface generally parallel to, and facing, the generally horizontal for clamping the first tow hook therebetween. The clamp plate further includes a third generally-vertical wall for engaging the first generally-vertical wall of the horizontal plate, and the clamp plate also includes a fourth generally vertical wall for engaging the second generally-vertical wall of the horizontal plate. A bolt extends through the hollow inner passage of the first tow hook for clamping the first tow hook between the horizontal plate, at the first end of the elongated frame member, and the clamp plate, with the third generally-vertical wall of the clamp plate engaging the first generally-vertical wall of the horizontal plate, and with the fourth generally-vertical wall of the clamp plate engaging the second generally vertical-wall of the horizontal plate. Preferably, the horizontal plate includes a threaded hole for receiving a threaded end of the first bolt, and to releasably clamp the first tow hook between the horizontal plate and the clamp plate; this threaded hole can advantageously be provided by first forming a non-threaded hole in the horizontal plate, and then securing, as by welding, a nut with a threaded bore to the horizontal plate adjacent to, or within, the non-threaded hole to provide the threaded hole.

Within this embodiment of the invention, the clamp plate preferably includes a boss that projects from the aforementioned hook-clamping surface for extending into the hollow inner passage of the first tow hook. In the preferred embodiment of the invention, this boss includes a sidewall, at least a portion of which generally conforms to, and abuts, the inner periphery of the first tow hook to further resist movement of the clamp plate relative to the first tow hook. The clamp plate ideally has an aperture formed therethrough and extending through the aforementioned boss, and the first bolt extends through such aperture for engaging a fastener associated with the horizontal plate.

The present invention in the form described immediately above can be further enhanced by providing a first pair of plates extending from the elongated frame member generally proximate to the first end thereof, each of the first pair of plates having a hole formed therethrough, for receiving a first end of a tow bar or the like. Likewise, a second, similar pair of plates may extend from the elongated frame member generally proximate to the second end thereof, for receipt of the second end of a tow bar or the like.

Still another aspect of the present invention relates to a hitch assembly for coupling to a tow hook of a vehicle, and including a first clamp member having a first generally-horizontal plate for engaging the lower face of the tow hook. The first clamp member includes a first generally-vertical wall that extends proximate to, and abuts, the generally rounded tip portion of the tow hook. The first clamp member also includes a second generally-vertical wall that extends generally parallel to the first vertical wall thereof, and which is adapted to extend inside the hollow inner passage of the tow hook. A second clamp member is also provided and includes a second generally-horizontal plate that extends generally parallel to, and facing, the first generally-horizontal plate for engaging the upper face of the tow hook and for clamping the tow hook therebetween. The second clamp member includes a forward edge for engaging the first generally-vertical wall of the first clamp member; the second clamp member also includes an opposing rear edge for engaging the second generally-vertical wall of the first clamp member. A connecting bolt extends through the hollow inner passage of the tow hook for clamping the tow hook between the generally horizontal plates of the first and second clamping members. The horizontal plate of the first clamp member includes a threaded hole for receiving the threaded end of the connecting bolt; as mentioned above, such a threaded hole may be provided by forming a non-threaded hole in the horizontal plate of the first clamp member, and then securing a nut with a threaded bore to the generally-horizontal plate of the first clamp member adjacent the non-threaded hole.

In regard to the foregoing embodiment, assuming that the inner passage of the tow hook includes a relatively straight rear wall defining the rear portion of the hollow inner passage thereof, then the second generally-vertical wall of the first clamp member preferably abuts the relatively straight rear wall of the tow hook. In this manner, the second vertical wall of the first clamp member is wedged between the relatively straight rear wall of the tow hook and the rear edge of the second clamp member when the hitch assembly is bolted onto the tow hook.

Also in regard to the foregoing embodiment, the second clamp member preferably includes a boss projecting from the generally horizontal plate thereof for extending into the hollow inner passage of the tow hook. This boss ideally includes a sidewall, at least a portion of which generally conforms to, and abuts, the inner periphery of the tow hook to resist movement of the second clamp member relative to the tow hook. The second clamp member has an aperture formed therethrough, which may also extend through the aforementioned boss, for allowing passage of the above-mentioned connecting bolt. If desired, a pair of tow bar plates may extend from the first generally-vertical wall of the first clamp member for receipt of the first end of a tow bar or the like.

Still another aspect of the present invention relates to a hitch assembly for coupling to a tow hook of a vehicle, and including a first clamp member having a generally-horizontal first plate for engaging the lower face of the tow hook. First and second generally-vertical walls extend from the generally-horizontal plate, generally parallel to each other, and lying on opposing sides of the tow hook. A second clamp member includes a generally-horizontal second plate for engaging the upper face of the tow hook, the second clamp member including a generally-vertical third wall that extends proximate the rounded tip portion of the tow hook. This third wall extends at a substantial angle to the first and second generally-vertical walls and abuts the front ends thereof. A first connecting bolt extends through the hollow inner passage of the tow hook, and extends at least partially through the generally-horizontal first and second plates, for clamping the tow hook between the generally horizontal plates of the first and second clamping members.

Preferably, the first connecting bolt extends proximate to the rounded tip portion of the tow hook for maintaining the rounded tip portion of the tow hook between the generally-vertical third wall of the second clamp member and the first connecting bolt. This helps to minimize front-to-rear movement of the tow hook relative to the first clamp member. Assuming that the head of the first connecting bolt engages the first clamp member, then a first threaded hole is preferably formed in the generally-horizontal second plate of the second clamp member for receiving the threaded end of the first connecting bolt. As mentioned above, this threaded hole may be formed by first providing a non-threaded hole in the generally-horizontal second plate, and then securing, e.g., by welding, a nut with a threaded bore to the generally-horizontal second plate adjacent the non-threaded hole.

To better ensure secure attachment of the hitch assembly to the tow hook, a second connecting bolt may extend through the hollow inner passage of the tow hook, at least partially through the generally-horizontal first and second plates, to aid in clamping the tow hook between the generally-horizontal first and second plates. In such event, a second threaded hole is provided for receiving the threaded end of the second connecting bolt. Ideally, the second connecting bolt extends proximate the rear inner wall of the hollow inner passage of the tow hook, opposite and spaced apart from, the generally rounded tip portion of the tow hook, to further minimize any front-to-back, movement of the hitch assembly relative to the tow hook. The aforementioned hitch assembly may optionally include a pair of plates extending from the generally vertical third wall of the second clamp member to form a bracket for receipt of the first end of a tow bar or the like. Alternatively, the described hitch assembly may optionally include a conventional receiver tube extending the second clamp member for removably receiving various accessory items.

In the event that the hitch assembly described above is used with an open, J-shaped hook terminating in a hooked end, the second clamp member may advantageously include a generally-vertical fourth wall extending generally parallel to, and spaced from, the generally-vertical third wall. This generally-vertical fourth wall preferably extends proximate to the hooked end of the tow hook, and at a substantial angle to the first and second generally-vertical walls of the first clamp member. In addition, this generally-vertical fourth wall preferably abuts a rear end of at least one of the first and second generally-vertical walls to help prevent rotation of the second clamp member relative to the first clamp member.

Alternatively, the first clamp member may advantageously include a generally-vertical fourth wall extending generally parallel to, and spaced from, the generally-vertical third wall of the second clamp member. This generally-vertical fourth wall preferably extends proximate to the hooked end of the tow hook, and at a substantial angle to the first and second generally-vertical walls of the first clamp member.

Yet another aspect of the present invention relates to a hitch assembly for attachment to first and second tow hooks of a vehicle, having an elongated frame member, with first and second ends for engaging the first and second tow hooks using a clamp plate in the general manner described above, and wherein the attachment bolt extends through the hollow inner passage of the tow hook proximate the rounded tip portion thereof for maintaining the rounded tip portion of the first tow hook between the generally-vertical third wall of the clamp member and the first attachment bolt, thereby minimizing front-to-rear movement of the tow hook relative to the generally-horizontal plate and the clamp member. Ideally, a second attachment bolt also extends through the hollow inner passage of the tow hook proximate the rear inner wall of the hollow inner passage of the tow hook, thereby further minimizing front-to-rear movement of the first tow hook relative to the generally-horizontal plate and the clamp member.

Still another aspect of the present invention relates to a hitch assembly for attachment to first and second tow hooks of a vehicle, wherein the hitch assembly includes a first tow hook clamp assembly for being clamped to the first tow hook, and a second tow hook clamp assembly for being clamped to the second tow hook. The first and second tow hook clamp assemblies include first and second receiver tubes, respectively. A first received member is inserted within the first receiver tube and supported thereby, and a second received member is inserted within the second receiver tube and supported thereby. These first and second received members may be coupled to each other by a cross-member. If desired, a third receiver tube may extend from said cross-member.

BRIEF DESCRIPTION OF THE DRAWINGS

FIG. 11 is a perspective view of a tow hook hitch assembly constructed in accordance with an alternate embodiment of the present invention.

FIG. 12 is a bottom perspective view showing the underside of one end of the hitch assembly shown in FIG. 11, with the clamping mechanism in its assembled configuration.

FIG. 13 is a second bottom perspective view similar to FIG. 12 but showing the clamping mechanism components prior to assembly.

FIG. 14 is a perspective view of the contoured clamping surface of the clamping member adapted to engage the hooked end of an open, J-shaped tow hook.

FIG. 15 is a bottom view of the clamping mechanism depicted in FIG. 12.

FIG. 16 is a perspective view of a tow hook hitch assembly constructed in accordance with an alternate embodiment of the present invention.

FIG. 17 is a sectional view of the tow hook shown in FIG. 16 after being clamped between one end of the elongated frame member and an associated clamp member.

FIG. 18 is a bottom perspective view of the clamp member shown in FIG. 16.

FIG. 19 is a sectional view of the elongated frame member shown in FIG. 16, but including a tow bar bracket extending therefrom.

FIG. 23 is a perspective view of an alternate clamping mechanism for securing a tow hook to one end of an elongated hitch assembly frame member.

FIG. 24 is a second perspective view of the alternate clamping mechanism for securing a tow hook to one end of an elongated hitch assembly frame member.

FIG. 25 is a sectional view of the components shown in FIGS. 23 and 24.

FIG. 26 is a perspective view of an alternate clamping mechanism for being secured over a tow hook without the need for a shaped insert to be extended within the tow hook.

FIG. 27 is a sectional view of the components shown in FIG. 26.

FIG. 28 is a perspective view of an alternate clamping mechanism for securing a tow hook to one end of an elongated hitch assembly frame member.

FIG. 29 is a sectional view of the components shown in FIG. 28.

FIG. 30 is a perspective view of a hitch assembly including two tow hook clamping mechanisms, each providing a receiver tube, and a cross member adapted to be received by such receiver tubes.

FIG. 31 is a perspective view of an alternate embodiment of a hook-clamping mechanism for use with closed loop hooks having a horse-shoe style configuration.

FIG. 32 is a perspective view of an alternate embodiment of a hook-clamping mechanism adapted for J-shaped open tow hooks without the need for a shaped insert.

DETAILED DESCRIPTION OF THE PREFERRED EMBODIMENTS

Figure 1:
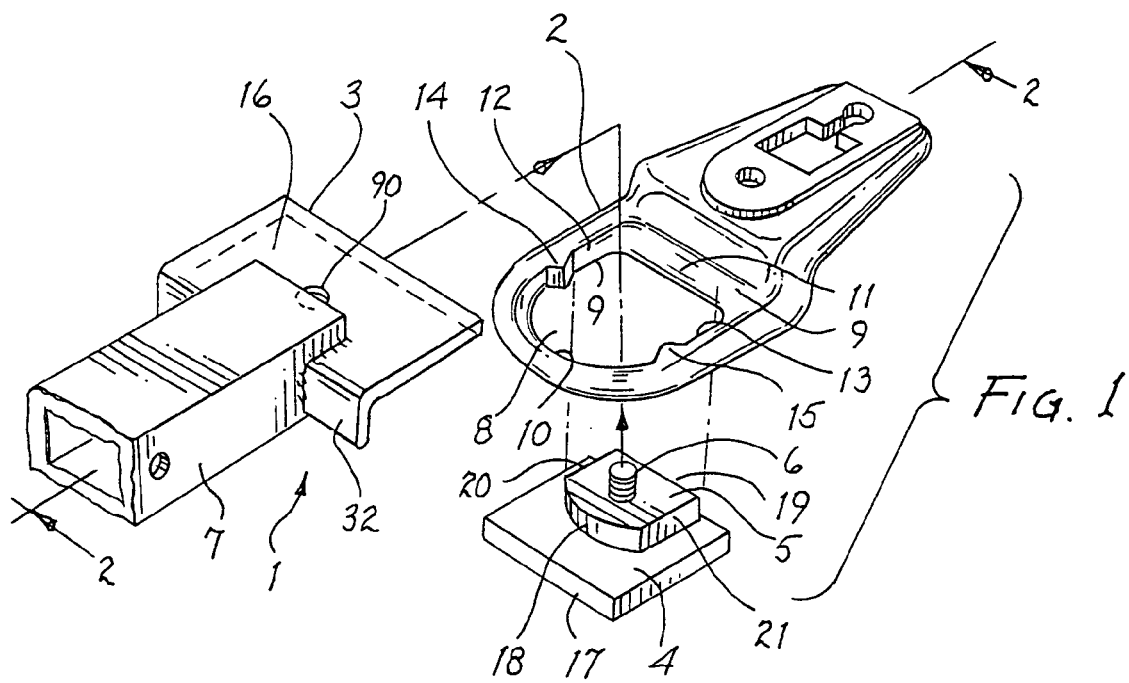
FIG. 1 is a perspective view of a receiver hitch assembly, including a tow hook, in accordance with a first embodiment of the present invention.
Figure 2:
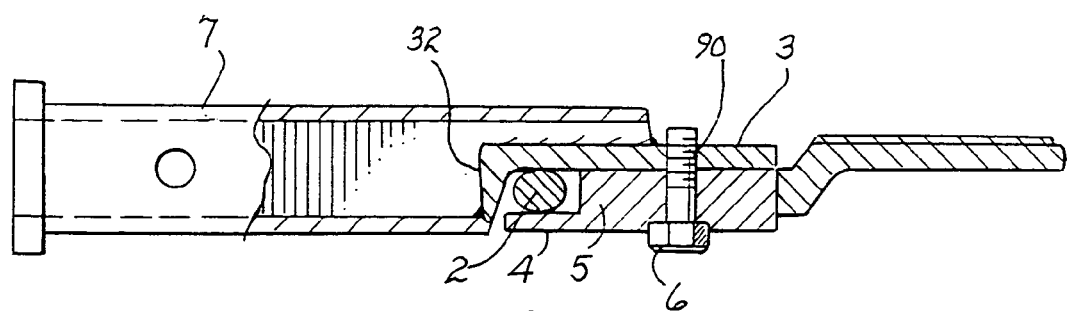
FIG. 2 is a sectional view of the assembly of FIG. 1, showing the tow hook mounted within the assembly.
Figure 3:
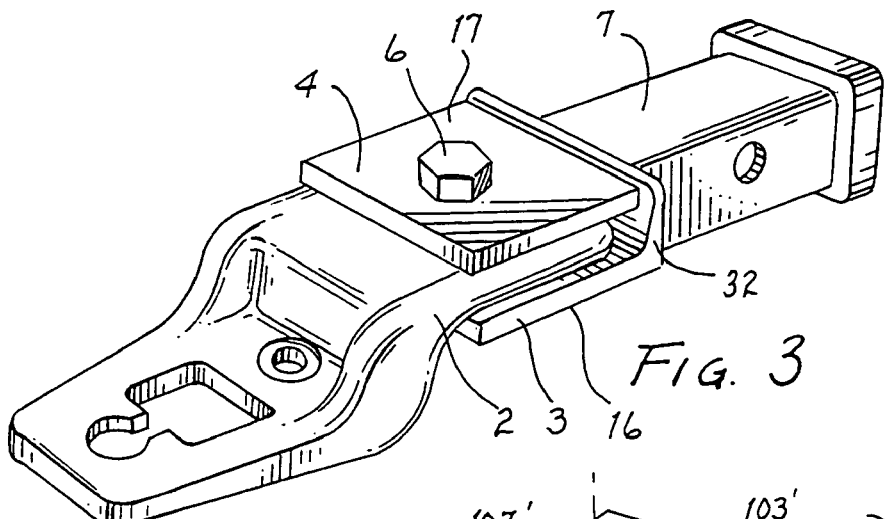
FIG. 3 is a view similar to FIG. 1, showing the tow hook mounted within the assembly, the view being rotated 180° (i.e., upside down) from that of FIG. 1.

FIGS. 1-3 illustrate a receiver hitch assembly 1 for a tow hook 2 according to a first embodiment of the present invention. While tow hook 2 is shown as being in the form of a U-shaped closed hook, it could also be a J-shaped, open hook. The hitch assembly includes first and second frame members 3 and 4, corresponding to plates 16 and 17. The hitch assembly also includes a hook engagement member 5 and a securing member shown in the form of a bolt 6. As shown in FIGS. 1 and 2, hook engagement member is integral with plate 4/17, although it could alternatively be made separate from, and then attached (as by welding), to plate 4/17. Moreover, while hook engagement member 5 is shown as being secured to, or integral with plate 4/17, it could instead be secured to, or integral with, plate 3/16.

The hitch assembly further includes a square-channel tubular receiver 7 welded at one end thereof to plate 3/16. As shown in FIGS. 1-3, plate 3/16 preferably includes a reinforcing side wall 32 extending approximately perpendicular therefrom, and receiver 7 can be simultaneously welded to both plate 3/16 and side wall 32. Side wall 32 abuts the outer periphery of tow hook 2 and facilitates proper positioning and alignment of upper plate 3/16 during installation. If desired, receiver 7 could instead by secured to lower plate 4/17. Incidentally, those skilled in the art will appreciate that hitch assembly 1 may be installed over tow hook 2 with either plate 3/16 on top or plate 4/17 on top. Receiver 7 is of conventional style for receiving a tow ball, winch, or other accessory. All components of the hitch assembly are preferably made of steel.

When attaching hitch assembly 1 to tow hook 2, plate 4 and hook engagement member 5 are positioned below tow hook 2. Bolt 6 passes through smooth holes formed in plate 4 and hook engagement member 5. Plate 3 is then positioned above tow hook 2, and threaded hole 90 formed in plate 3 is aligned with the threaded end of bolt 6. Bolt 6 is then tightened. Consequently, hook 2 and engagement member 5 are sandwiched between first and second plates 3 and 4, and threaded bolt 6 holds the assembly together, as illustrated in FIGS. 2 and 3. A highly secure connection is thereby achieved, and the resulting connection resists any twisting or pivotal loads. It should be noted that, while a bolt 6 and threaded hole other members for securing the components of the assembly together may be used, such as a clamp, for example.

Hook engagement member 5 fits within the inner region 8 of tow hook 2, and is also shaped to engage at least a portion of the inner peripheral side areas 9 of inner region 8, thereby opposing pivotal motion of tow hook 2 with respect to hitch assembly 1. Hook engagement member 5 may further be specifically molded or shaped to conform to any portion, or the entire peripheral area, of the inner region 8 of tow hook 2. Described hitch assembly 1 may be used with any type of hook, including U- and J-shaped hooks.

Still referring to FIGS. 1-3, tow hook 2 is U-shaped and includes opposing front and back regions 10 and 11. Front region 10 is curved, while back region 11 is relatively straight. Front and back regions 10 and 11 are connected to each other by opposing side regions 12 and 13. Side regions 12 and 13 each have a jut, 14 and 15 respectively, protruding inwardly toward the center of inner region 8. Hook engagement member 5 shown in FIGS. 1 and 2 covers substantially all of the inner region 8 of tow hook 2. Hook extending member 5 includes front and back walls, 18 and 19, as well as side walls 20 and 21. Front wall 18 is curved, while back wall 19 is straight, thereby conforming to the shape of the front and back regions 10 and 11, respectively, of tow hook 2. Straight side walls 20 and 21 contact the inwardly directed juts 14 and 15 on the side regions 12 and 13 of tow hook 2. If desired, side walls 20 and 21 of hook engagement 5 could include grooves, or indented regions, to matingly receive juts 14 and 15.

Figure 4:
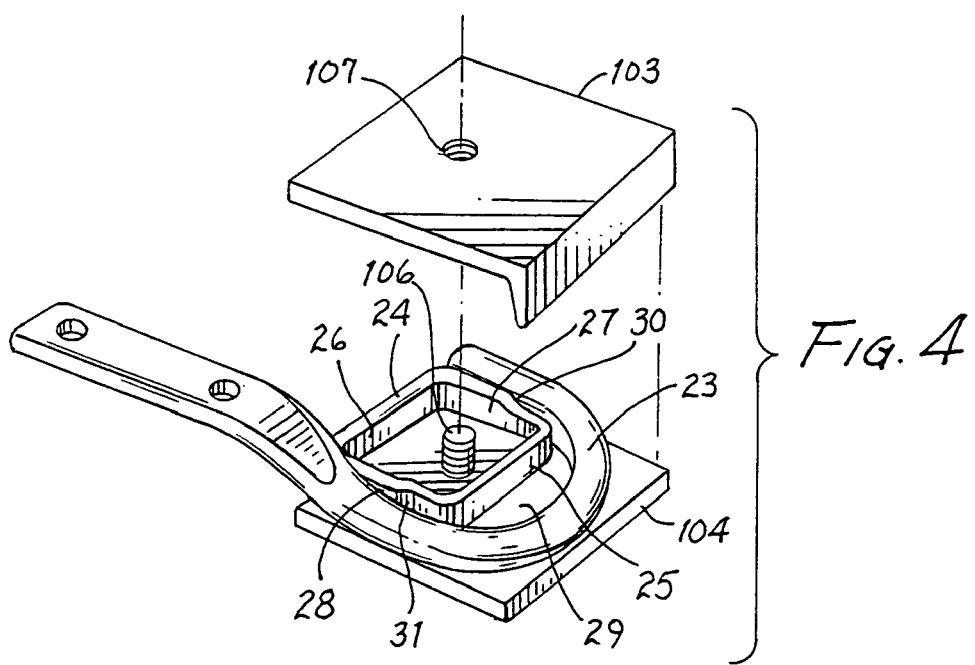
FIG. 4 is a perspective view of a receiver hitch assembly, including a tow hook partially mounted within the assembly, in accordance with a second embodiment.

An alternate embodiment of the present invention is illustrated in FIG. 4, shown for use with a J-shaped tow hook 23. Lower plate 104 includes hook engagement member 24. Hook engagement member 24 is formed from front wall 25, back wall 26, side wall 27, and side wall 28, rather than being a solid mass. Side walls 27 and 28 of hook engagement member 24 contact opposing inner-peripheral side walls 30 and 31 of the inner region 29 of tow hook 23, conforming thereto. The threaded end of bolt 106 engages threaded hole 107 in plate 103 to clamp the hitch assembly together.

Figure 5:
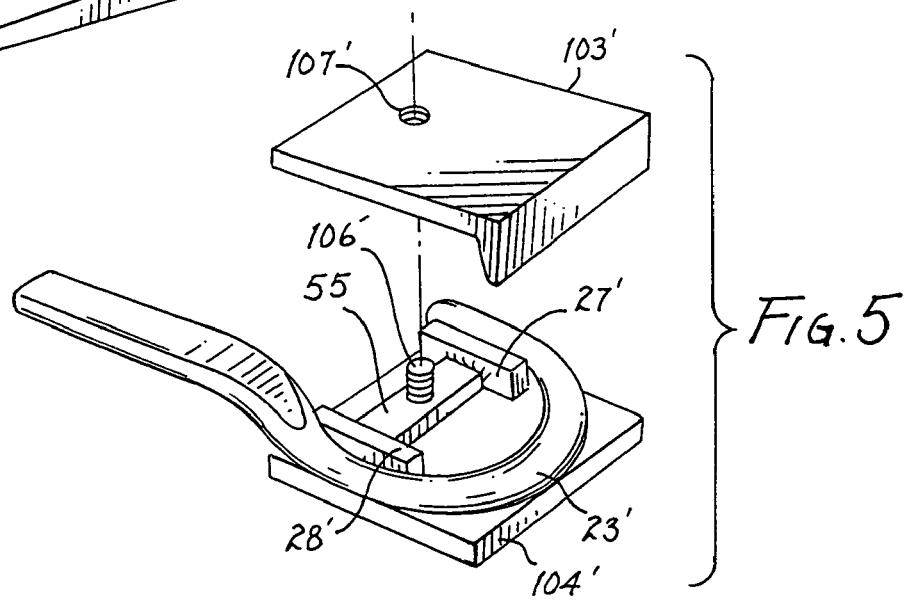
FIG. 5 is a perspective view of a receiver hitch assembly, including a tow hook partially mounted within the assembly, in accordance with a third embodiment.

Yet another embodiment of the present invention, shown in FIG. 5, includes an engagement member omitting front and back walls, but retaining side walls 27' and 28' for engaging the opposing inner-peripheral side walls of tow hook 23'. In the embodiment of FIG. 5, an inner cross wall 55 extends between the two side walls 27' and 28' for added reinforcement.

Figure 6:
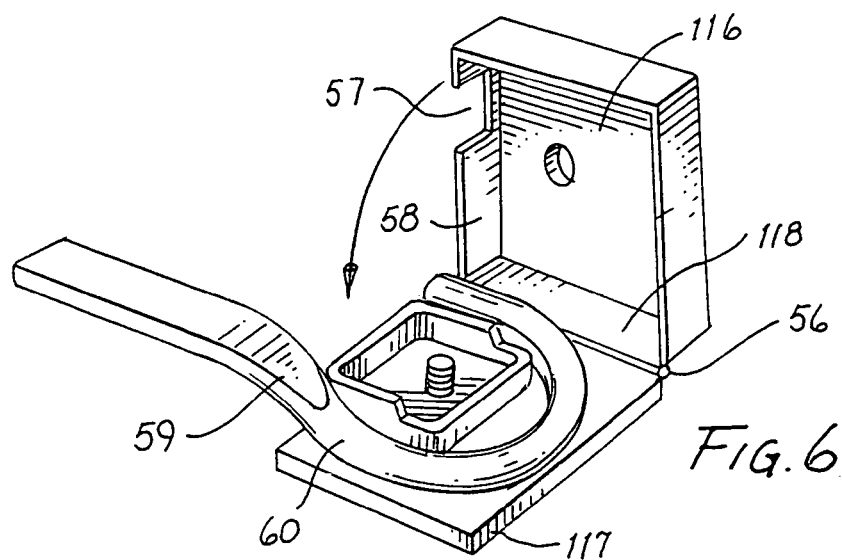
FIG. 6 is a perspective view of a receiver hitch assembly, including a tow hook partially mounted within the assembly, in accordance with a fourth embodiment.

Though tow hitch assembly 1 of FIGS. 1-3 is illustrated as including only one side wall 32, the first and second frame members, or plates, of the tow hitch may include additional side walls extending from such plates. For example, frame member 3 of FIGS. 1-3 may include two additional and opposite side walls extending from plate 16 and adjacent to the wall 32 to form a pocket extending around the hook. Also, as illustrated in FIG. 6, frame members 116 and 117 may be connected by a side wall 118 having a hinge connection 56 between the plates of such frame members. Furthermore, as shown in FIG. 6, side wall 58 extends across tow hook 60 and includes an opening 57 so as not to obstruct mounting and assembly of the tow hitch assembly to tow hook 60. Opening 57 accommodates passage of arm 59 of tow hook 60; two such openings may be included to accommodate passage of a U-shaped hook.

Figure 7:
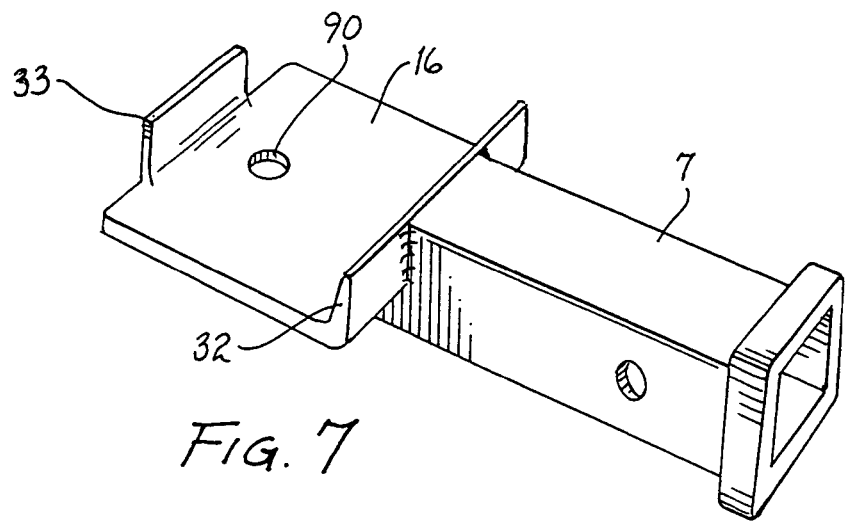
FIG. 7 is a perspective view of a receiver hitch assembly, including a tow hook partially mounted within the assembly, in accordance with a fifth embodiment.

A further embodiment is illustrated in FIG. 7, using the same reference numerals as in FIGS. 1-3, wherein the frame member 3 includes an additional truncated wall, or tongue 33, opposite wall 32, which wedges between hook engagement member 5 and back wall 11 of the inner region 8 of tow hook 2.

Figure 8:
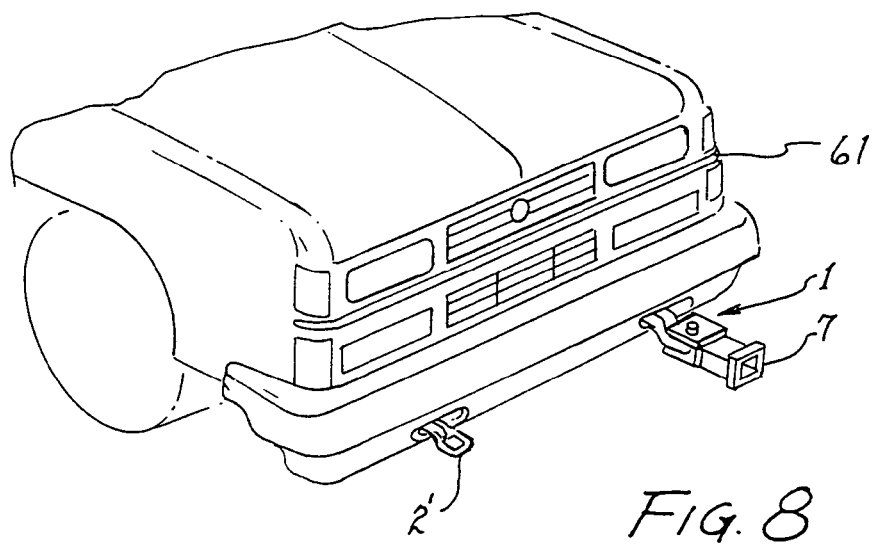
FIG. 8 is a perspective view of a receiver hitch assembly, in accordance with the present invention, mounted to one tow hook of a vehicle.

The assembly illustrated in FIGS. 1-7 may be used to attach a receiver to only one tow hook of a vehicle 61, as illustrated in FIG. 8. Alternatively, at least one frame member may span virtually the length of the vehicle bumper for attachment of a tow hitch assembly to both front tow hooks, as shown in FIGS. 9 and 10.

Figure 9:
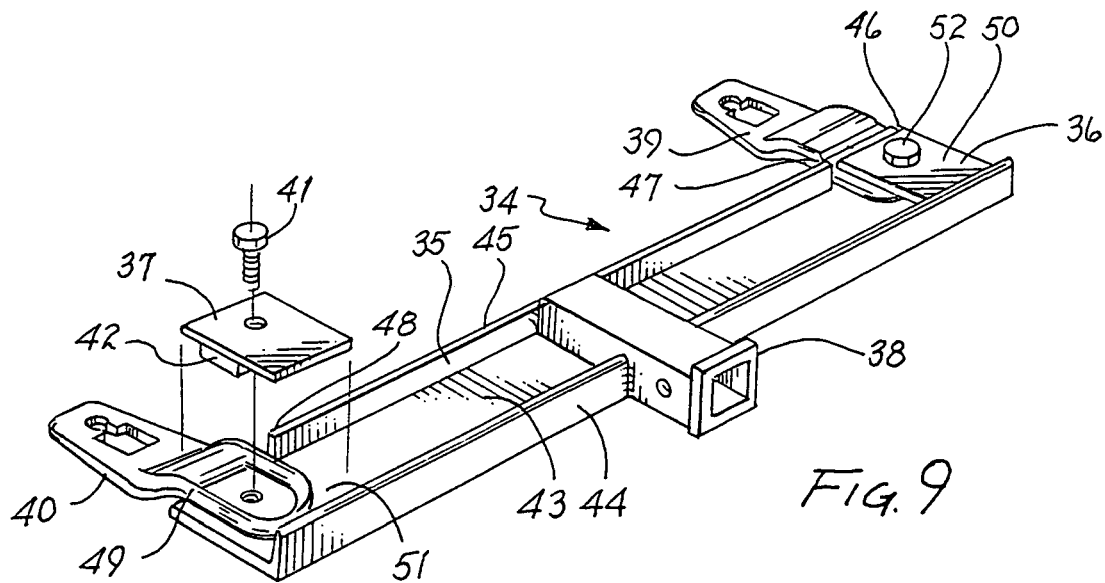
FIG. 9 is a perspective view of a receiver hitch assembly, configured for mounting two tow hooks of a vehicle, in accordance with a sixth embodiment.
Figure 10:
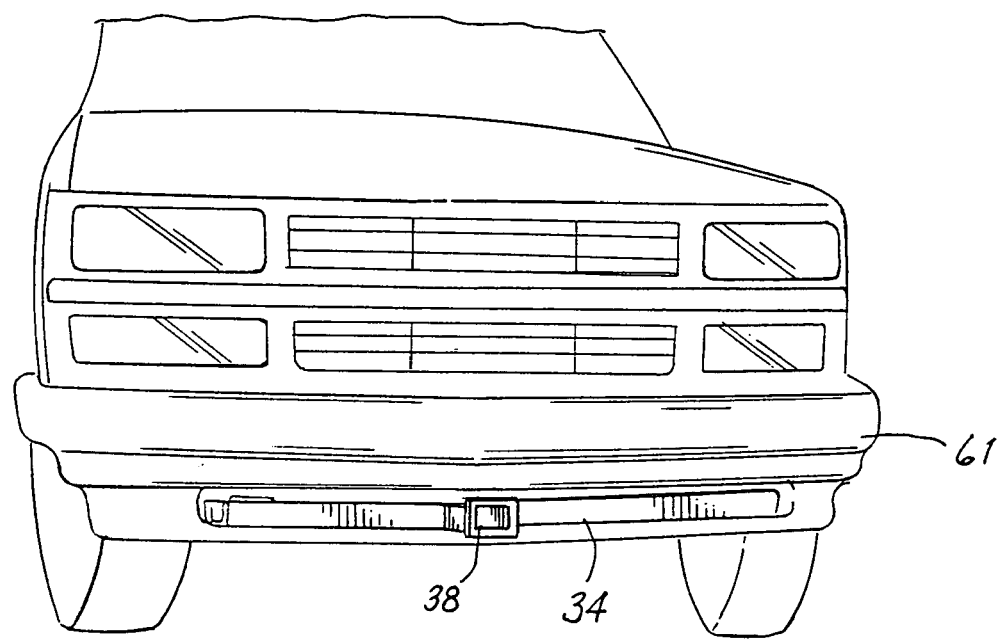
FIG. 10 is a perspective view of the receiver hitch assembly of FIG. 9 mounted to a vehicle.

FIG. 9 illustrates a tow hitch assembly 34 configured for mounting to two vehicle tow hooks 39 and 40, disposed on the right and left sides of a vehicle bumper. The assembly 34 comprises a first elongated frame member 35, a second frame member in the form of a short plate 36, and a third frame member in the form of a short 37. Tow hitch receiver is centrally mounted attached to first frame member 35. Bolts 41 and 52 are installed on either side to secure the assembly together Additionally, a right side hook engagement member (not visible) and a left side hook engagement member 42, are preferably formed integral with plates 36 and 37. The first frame member 35 spans the distance between vehicle hooks 39 and 40. The left end 51 of first frame member 35 is disposed below tow hook 40, and the right end 50 of first frame member 35 is disposed below tow hook 39. The first frame member 35 further includes a bottom horizontal plate 43, front wall 44, and rear wall 45. Back wall 45 stops short at ends 47 and 48 to avoid interference with the passage of tow hooks 39 and 40. The assembly 34 is shown mounted to vehicle 61 in FIG. 10. When installing assembly 34 of FIGS. 9 and 10 on vehicle 61, a user separately secures each end 50 and 51 of first frame member 35 to tow hooks 39 and 40, using the procedure already described above in conjunction with FIGS. 1-8.

Referring now to FIGS. 11-15, a hitch assembly constructed in accordance with another embodiment of the present invention is designated generally by reference numeral 200. FIG. 11 shows the hitch assembly as it would normally appear installed on a vehicle, while FIGS. 12-15 are viewed from below the assembly to help illustrate the manner in which hitch assembly 200 is secured to the tow hooks of the vehicle. Hitch assembly 200 is adapted to be attached to a first tow hook 201 and a second tow hook 202 of a vehicle. For purposes of FIGS. 11-15, tow hooks 201 and 202 are shown as J-shaped, open hooks. Tow hooks 201 and 202 are spaced apart from each other by a predetermined separation distance for a given type of ~ehicle. As shown best in FIG. 13, each tow hook includes a hollow inner passage 204. Tow hook 201 includes a mounting bolt. 203 for securing tow hook 201 to a vehicle (not shown).

Hitch assembly 200 includes an elongated frame member 206 extending between a first end 208 and a second opposing end 210, generally along a longitudinal axis. While, in some cases, elongated frame member 206 may be relatively straight, some vehicles require that elongated frame member 206 be slightly bent, as shown in FIG. 11, to avoid interference with bumpers or other components of the vehicle. As indicated in FIG. 11, elongated frame member 206 has a length commensurate with, or slightly longer than, the aforementioned separation distance that separates tow hooks 201 and 202 from each other.

As shown in FIG. 11, first end 208 of frame member 206 is engaged with tow hook 201, and second end 210 is engaged with second tow hook 202. As shown in FIG. 11, frame member 206 includes a front wall 212 and a top wall 214. If desired, front wall 212 and top wall 214 may be fabricated from a single piece of "angle iron" made from steel or the like. A receiver tube 209 is preferably secured to the center of frame member 206, and extends forwardly therefrom to receive a tow ball or other conventional accessories. Now turning to FIGS. 12, 13, and 15, it will be seen that the underside of frame member 206 includes a bottom wall 216 and a rear wall 218; if desired, bottom wall 216 and rear wall 218 may be integral with each other, and may likewise be formed from "angle iron" stock made of steel or the like. As shown in FIG. 12, the edge of rear wall 218 is welded to the underside of top wall 214, and the edge of bottom wall 216 is welded to front wall 212, thereby forming a closed, hollow cross-sectional profile as viewed perpendicular to the longitudinal axis of frame member 206. This cross-sectional profile is generally rectangular to provide a box-like channel. This box-like channel preferably extends throughout the central region of frame member 206 to provide structural integrity. If desired, front wall 212, bottom wall 216, and rear wall 218 may be cut away at the very center of frame member 206 to allow for passage of receiver tube 209. Bottom wall 216 and rear wall 218 stop short of the ends 208 and 210 of frame member 206 to allow tow hooks 201 and 202 to be inserted adjacent the bottom face of top wall 214. If desired, the end of this box-like structure can be closed by welding an end cap 228 thereover to seal the hollow channel thereof.

A first clamp plate 230 is shown in FIGS. 12-14 disposed proximate to tow hook 201 proximate to, and facing, first end 208 of frame member 206. As shown best in FIG. 13, this first clamp plate 230 is adapted to engage the lower face of tow hook 201; the underside of top wall 214, at the first end 208 of frame member 206, is adapted to engage the upper face of tow hook 201. The underside of top wall 214 may thus be regarded as a first horizontal plate in the region where it engages the upper face of tow hook 201. While not illustrated, those skilled in the art will understand that a second clamp plate is similarly positioned proximate to second tow hook 202 for clamping tow hook 202 against the underside of top wall 214 at the second end 210 of frame member 206. Likewise, the underside of top wall 214 at the second end 210 of frame member 206 may be regarded as a second horizontal plate in the region wherein it engages the upper face of tow hook 202.

A first bolt 232 having a threaded end extends through a smooth aperture 234 formed in clamp plate 230, and through the hollow inner passage 204 of tow hook 201, for engaging a threaded aperture 236 provided in top wall 214 of frame member 206. As bolt 232 is tightened, it clamps tow hook 201 between the underside of top wall 214, near first end 208 of frame member 206, and first clamp plate 230. As shown in FIGS. 13 and 15, the threaded aperture 236 formed in top wall 214 at first end 208 is preferably formed by providing a non-threaded, oversized hole in top wall 214, and then securing, as by welding, a nut 238 with a threaded bore either within, or adjacent the non-threaded hole, so that the center of nut 238 is aligned with the center of the oversized hole. While not illustrated, a similar bolt, and a similar threaded aperture, are provided second end 210 of frame member 206 for similarly clamping the second tow hook 202 between the underside of wall 214 and the second clamp plate (not shown).

Still referring to FIGS. 11-15, front wall 212 of frame member 206 may be regarded as a first vertical wall extending from the underside of top wall 214, generally perpendicular thereto, proximate first end 208 of frame member 206. First end 208 includes a second generally-vertical wall 240 closing off first end 208. End wall 240 extends from the underside of top wall 214, generally perpendicular thereto, and at a substantial angle to front wall 212. Clamp plate 230 includes a relatively shallow generally-vertical wall 242 formed by the frontmost edge thereof (see FIG. 14). This vertical wall 242 of clamp plate 230 engages the inner face of front wall 212 as clamp plate 230 is engaged over tow hook 201. In addition, clamp plate 230 includes another relatively shallow generally-vertical wall 244 for engaging the inner face of end wall 240 when clamp plate 230 is engaged over tow hook 201. The above-described engagement between wall 242 with wall 212, and between wall 244 with wall 240, ensures a secure, non-twisting connection between clamp plate 230 and first end 208 of frame member 206, restricting both rotational and lateral movement therebetween.

As best shown in FIG. 14, the face of clamp plate 230 which engages the lower face of tow hook 201 includes a hook-clamping surface 248, extending generally parallel to, and facing the horizontal plate underside of top wall 214 near first end 208 for clamping tow hook 201 therebetween. As also shown in FIG. 14, a contoured boss 250 extends from clamping surface 248 and is shaped to fit within the inner passage of tow hook 201. Tow hook 201 includes an inner periphery 252 (see FIG. 13), and projecting boss 250 includes a sidewall 254 (see FIG. 14) which generally conforms to and abuts, inner periphery 252 of tow hook 201 to further resist movement of clamp plate 230 relative to tow hook 201. Since boss 250 extends within the inner passage of tow hook 201, aperture 234, and bolt 232, extend fully through boss 250, as shown in FIGS. 13 and 14.

Referring now to FIGS. 16-19, another alternate embodiment of a hitch assembly is illustrated, and is identified generally by reference numeral 260. Hitch assembly 260, and related tow hook 262 are shown upside down in FIGS. 16 and 17 to better illustrate the manner in which hitch assembly 260 is secured over first tow hook 262 and a second similar tow hook (not shown). As illustrated in FIGS. 16-18, tow hook 262 is a closed, loop tow hook having a hollow inner passage 264. Tow hook 262 includes mounting holes 266 for securing tow hook 262 to a vehicle (not shown). Tow hook 262 includes a generally rounded tip portion 265 extending away from the vehicle.

Hitch assembly 260 includes an elongated frame member 268 extending between a first end 270 and an opposing second end (not shown), generally along a longitudinal axis. As in the embodiment shown in FIGS. 11-15, hitch assembly 260 is somewhat angled or bent to avoid interference with bumpers or other components of the vehicle. First end 270 of frame member 268 is engaged with tow hook 262; the opposing second end of frame member 268 is engaged with a second similar tow hook (not shown). As shown in FIGS. 16 and 17, frame member 268 includes a front wall 272 and a top wall 276. If desired, front wall 272 and top wall 276 may be fabricated from a single piece of "angle iron" made from steel or the like. A receiver tube 278 is preferably secured to the center of frame member 268, and extends forwardly therefrom to receive a tow ball or other conventional accessories. As shown in FIGS. 16 and 19, frame member 268 also includes an angled bottom wall 280 made of steel or the like; the opposing elongated edges of bottom wall 280 are attached, as by welding, to the remote edges of front wall 272 and top wall 276 to form a closed, hollow cross-sectional profile that is generally triangular, thereby providing a triangular-shaped channel, as viewed perpendicular to the longitudinal axis of frame member 206. As shown in FIG. 16, front wall 272 and bottom wall 280 may be cut away at the very center of frame member 268 to allow for passage of receiver tube 278.

As shown in FIG. 16, bottom wall 280 stops short of the end 270 of frame member 268 to allow tow hook 262 to be inserted adjacent the bottom face of top wall 276, with rounded tip portion 265 of tow hook 262 extending proximate to, and preferably abutting, the inner face of front wall 272. The end of the triangular profile structure is shown being closed off by welding a triangular plate 284 thereover. Triangular plate 284 is sometimes referred to herein as an inboard support wall. Triangular plate 284 is secured generally proximate to first end 270 of frame member 268 but inset therefrom. Triangular plate 284 extends generally perpendicular to the underside of top wall 276; triangular plate 284 also extends at a substantial angle to front wall 272 (virtually perpendicular thereto in the embodiment of FIG. 16), and at a substantial angle relative to the longitudinal axis of frame member 268.

A first clamp plate 286 is shown in FIGS. 16-18. Clamp plate 286 is positioned proximate to tow hook 262, and facing the underside of top wall 276 at first end 270 of frame member 268. As shown best in FIGS. 16 and 17, clamp plate 286 engages the lower face of tow hook 262; the underside of top wall 276, at the first end 270 of frame member 268, is adapted to engage the upper face of tow hook 262. The underside of top wall 276 may thus be regarded as a first horizontal plate, or clamping surface, in the region where it engages the upper face of tow hook 262. While not illustrated, those skilled in the art will understand that a second clamp plate is similarly positioned proximate to the second tow hook for clamping the second tow hook against the underside of top wall 276 at the second end of frame member 268. Likewise, the underside of top wall 276 at the second end of frame member 268 may be regarded as a second horizontal plate, or clamping surface, in the region wherein it engages the upper face of the second tow hook.

A first bolt 288 having a threaded end extends through a smooth aperture 290 formed in clamp plate 286, and through the hollow inner passage 264 of tow hook 262, for engaging a threaded aperture 292 provided in top wall 276 of frame member 268. As bolt 288 is tightened, it clamps tow hook 262 between the underside of top wall 276, near first end 270 of frame member 268, and first clamp plate 286. As shown in FIGS. 16 and 17, the threaded aperture 292 formed in top wall 276 at first end 270 is preferably formed by providing a non-threaded, oversized hole in top wall 276, and then securing, as by welding, a nut 294 with a threaded bore either within, or adjacent the non-threaded hole, so that the center of nut 294 is aligned with the center of the oversized hole. While not illustrated, a similar bolt, and a similar threaded aperture, are provided at the opposing second end of frame member 268 for similarly clamping the second tow hook between the underside of top wall 276 and the second clamp plate.

Still referring to FIGS. 16-17, front wall 272 of frame member 268 may be regarded as a first vertical wall extending from the underside of top wall 276, generally perpendicular thereto, proximate first end 270 of frame member 268. First end 270 includes another generally-vertical wall 296 closing off first end 270. End wall 296 extends from the underside of top wall 276, generally perpendicular thereto, and at a substantial angle to front wall 272. End wall 296 also extends substantially parallel to triangular plate 284 and is spaced therefrom by approximately the width of tow hook 262, preferably allowing the opposing sides of tow hook 262 to engage end wall 296 and triangular plate 284. Clamp plate 286 includes a relatively shallow generally-vertical wall front wall 298 formed by the frontmost edge thereof. This vertical wall 298 of clamp plate 286 engages the inner face of front wall 272 as clamp plate 286 is engaged over tow hook 262. In addition, clamp plate 286 includes another relatively shallow generally-vertical wall 300 for engaging the inner face of end wall 296 when clamp plate 286 is engaged over tow hook 262. The opposing edge 302 (see FIG. 18) of clamp plate 286 engages a portion of triangular plate 284.

Preferably, frame member 268 also includes a first tab 304 extending from the underside of top wall 276 generally parallel to and spaced from front wall 272; first tab 304 extends within the hollow inner passage 264 of tow hook 262. While not shown, frame member 268 includes a second tab extending from the underside of top wall 276 at the opposing second end of frame member 268, for extending within the second tow hook. As first tab 304 is inserted into tow hook 262, tab 304 lies adjacent, and preferably engages, the relatively straight rear wall 306 that defines the rear periphery of the hollow inner passage 264 of tow hook 262, and which lies opposite the generally-rounded tip portion 265 of tow hook 262. When clamp plate 286 is inserted over tow hook 262, the rear edge 308 engages tab 304; tab 304 is thereby wedged between the relatively straight rear wall 306 of tow hook 262 and rear edge 308 of clamp member 286. As bolt 288 is tightened, a secure engagement is made between front edge 298 of clamp plate 286 and the inner face of front wall 272; between side edge 300 of clamp plate 286 and the inner face of end wall 296; between side edge 302 of clamp plate 286 and triangular plate 284; and between rear edge 308 and tab 304.

As best shown in FIG. 18, the face of clamp plate 286 which engages the lower face of tow hook 262 includes a hook-clamping surface 310, extending generally parallel to, and facing the underside of top wall 276 near first end 270 for clamping tow hook 262 therebetween. To further ensure a secure, non-twisting engagement between first end 270 of frame member 268, tow hook 262, and clamp plate 286, contoured boss 312 extends from clamping surface 310 and is shaped to fit within the inner passage 264 of tow hook 262. The height of boss 312 is approximately the same as, or slightly less than, the thickness of tow hook 262. Projecting boss 312 includes a sidewall 314 (see FIG. 18) which generally conforms to, and abuts, the inner periphery of tow hook 262 to further resist movement of clamp plate 286 relative to tow hook 262. Since boss 312 extends within inner passage 264 of tow hook 262, aperture 290, and bolt 288, extend fully through boss 312, as shown in FIG. 17.

If desired, an accessory bracket, also known as a tow bar bracket, may be provided on frame member 268 for receiving the end of a conventional tow bar or some other accessory. Referring to FIGS. 16 and 19, a first pair of spaced parallel plates 320 and 322 extend from front wall 272 of frame member 268 generally proximate to the second end thereof. Preferably, plates 320 and 322 each have a hole 324 formed therethrough, such holes being aligned with each other for allowing the ; shaft of a connecting bolt (not shown) to pass through both of such holes. The end of a tow bar or other accessory, having an apertured formed therein, can be received between plates 320 and 322 and secured thereto by the aforementioned connecting bolt. If desired, a connecting reinforcement wall 326 may extend across the upper portions of plates 320 and 322 for securement thereto. Reinforcement wall 326 may additionally be attached to top wall 276 of frame member 268. If desired, a further hole 328 may be provided in reinforcement wall 326 to receive a bolt or other fastener. While only one such tow bar bracket is shown in FIG. 16 for the sake of clarity, those skilled in the art will appreciate that a second such tow bar bracket may be provided between central receiver tube 278 and first end 270 of frame member 268. By providing two such tow bar brackets, frame member 268 is adapted to receive the ends of a Y-shaped tow bar bracket, or any other accessory that includes two similar mounting ends.

Figures 20, 21, 22:
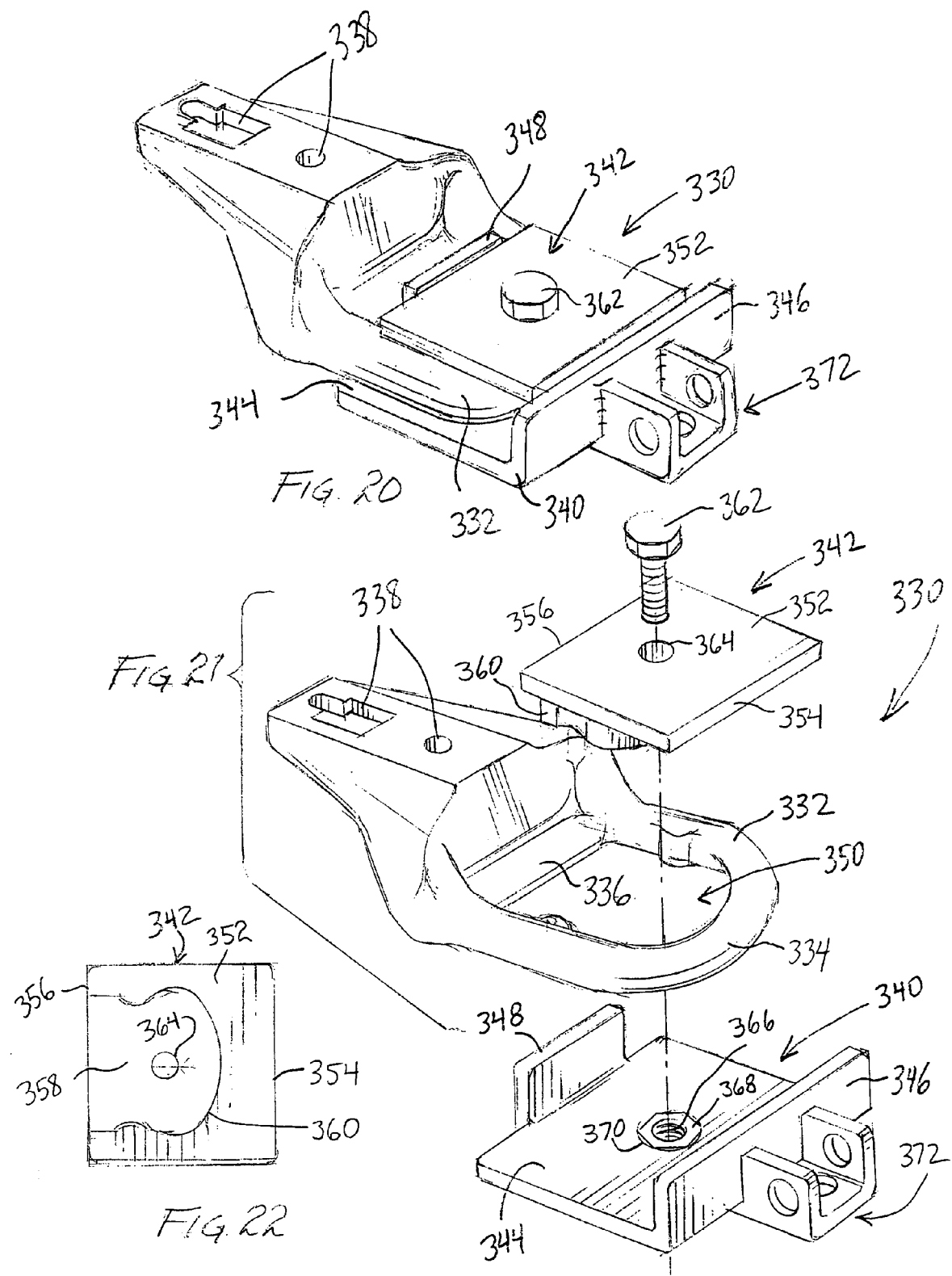
FIG. 20 is a perspective view of an alternate clamping mechanism, in its assembled configuration, for being secured over a tow hook using a shaped insert that extends within the tow hook, and illustrating the addition of a tow bar bracket.
FIG. 21 is a second perspective view of the alternate clamping mechanism shown in FIG. 20, but in its unassembled configuration.
FIG. 22 is a bottom view of the clamp member, and its associated shaped boss, shown in FIG. 21.

Turning now to FIGS. 20-22, an alternate embodiment of the hitch assembly of the present invention is shown for attachment to a single tow hook of a vehicle. Hitch assembly 330 is a simplified form of the components described above in conjunction with FIGS. 16-19. Tow hook 332 is a closed loop hook of the same type described above relative to FIGS. 16-19, including a rounded tip portion 334, a straight rear wall 336, and mounting holes 338 for attachment of tow hook 332 to the frame of a vehicle. Hitch assembly 330 includes a lower clamp member 340 and an upper clamp member 342. Lower clamp member 340 includes a generally-horizontal plate 344 for engaging the lower face of tow hook 332. Lower clamp member 340 also includes front and rear generally-vertical walls 346 and 348, respectively, generally parallel to, and facing, each other. Front wall 346 extends proximate the generally rounded tip portion 334 of tow hook 332, and ideally, abuts tip portion 334 when hitch assembly 330 is assembled. Rear wall 348 is in the form of an upwardly directed tab for extending into the inner hollow passage 350 of tow hook 332, and for bearing against rear wall 336 thereof.

Upper clamp member 342 includes a generally-horizontal plate 352 that is positioned generally parallel to, and facing, plate 344 of lower clamp member 340 for engaging the upper face of tow hook 332, and for clamping tow hook 332 between plates 344 and 352. Upper clamp member 342 includes a forward edge 354 for engaging vertical wall 346 of lower clamp member 340; upper clamp member 342 also includes an opposing rear edge 356 for engaging tab 348 of lower clamp member 340. Referring to FIGS. 21 and 22, the underside of upper clamp member 342 includes a projecting boss 358 extending downwardly from plate 352, and having a sidewall 360 generally shaped to conform to the interior periphery of hollow inner passage 350 of tow hook 332.

Connecting bolt 362 extends through an aperture 364 formed within plate 352 and boss 358, and extends through inner passage 350 of tow hook 332 for clamping tow hook 332 between plates 344 and 352 of the lower clamp member 340 and upper clamp member 342, respectively. A threaded hole 366, preferably in the form of a nut 368 welded within an oversized hole 370, is provided in plate 344 for threadedly engaging the threaded end of connecting bolt 362. When so assembled, rounded tip portion 334 of tow hook 332 preferably engages the inner face of front wall 346 of lower clamp member 340, tab 348 engages rear wall 336 of tow hook 332, sidewall 360 of boss 358 engages the inner periphery of tow hook 332, front edge 354 of plate 352 engages the inner face of front wall 346, and rear edge 356 engages tab 348, making a very stable connection between hitch assembly 330 and tow hook 332.

As shown in FIGS. 20 and 21, a tow bar bracket 372, similar to the tow bar bracket described above relative to FIGS. 16 and 19, may be provided extending from front wall 346 of lower clamp member 340, if desired. Alternatively, a conventional receiver tube may be secured to lower clamp member 340 in the manner already shown in FIG. 1.

FIGS. 23-25 illustrate another embodiment of a hitch assembly adapted to engage two tow hooks on a vehicle. The embodiment shown in FIGS. 23-25 is generally similar to that already described in conjunction with FIGS. 16-19, except that frame member 380 is formed of L-shaped "angle iron" stock, and extends in virtually a straight line along its longitudinal axis. As in the case of FIG. 16, FIGS. 23-25 are shown upside-down to better illustrate the clamping mechanisms used to attach the hitch assembly to tow hooks 388 and 390. A conventional receiver tube 382 is again provided midway along frame member 380, and the opposing ends 384 and 386 of frame member 380 are adapted to engage tow hooks 388 and 390, respectively. Clamp members 392 and 394 are provided for clamping tow hooks 388 and 390, respectively, against the underside of horizontal wall 396 of frame member 380. Connecting bolts 400 and 402 maintain clamp members 392 and 394 in place, respectively. Threaded hole 404 is formed in horizontal wall 396 near end 384 of frame member 380 for receiving the threaded end of bolt 400; a similar threaded hole is provided near end 386 of frame member 380 to receive bolt 402. Clamp member 392 preferably include a projecting boss 406 shaped to conform to, and to extend within, the inner passage of tow hook 388. Frame member 380 includes a front wall against which the rounded tip portions of tow hooks 388 and 390 are engaged. Frame member 380 may also include a pair of tabs 408 and 410 spaced from front wall 398 and generally parallel thereto for extending within the inner passages of tow hooks 388 and 390, respectively in a manner already described. If desired, frame member 380 may include an end wall 412 and an inboard support wall 414, generally parallel to each other, and both extending generally perpendicular to horizontal wall 396 and front wall 398. End wall 412 and inboard support wall 414 are spaced from each other by the width of tow hook 388 and engage opposing sides of tow hook 388, in a manner previously described.

Referring now to FIGS. 26 and 27, an alternate embodiment of a hitch assembly for a single tow hook is illustrated. Upper clamp member 420 includes a horizontal plate 422 that is positioned above tow hook 424, and includes a receiver tube 426 extending therefrom. Upper clamp member 420 also includes a generally-vertical front wall 428 that abuts the rounded tip portion 430 of tow hook 424. Lower clamp member 432 is provided in the form of U-shaped structure having a lower horizontal plate 434 and a pair of opposing generally-vertical side walls 436 and 438 spaced from each other by the width of tow hook 424. Thus, the inner faces of side walls 436 and 438 engage the opposing sides of tow hook 424. The upper edges of side walls 436 and 438 also preferably abut the underside of horizontal wall 422 of upper clamp member 420 after final assembly. Likewise, the forwardmost edge 440 of plate 434, and forwardmost edges 442 and 444 of side walls 436 and 438, respectively, all preferably engage the inner face of vertical wall 428 after final assembly. A connecting bolt 446 extends upwardly through plate 434, and through the inner passage of tow hook 424, for being received by a threaded hole 450 formed in horizontal wall 422 of upper clamp member 420. Preferably, connecting bolt 446, and threaded hole 450, are positioned to locate the shaft of bolt 446 against the inner periphery of the rounded tip portion 430 of tow hook 424. Rounded tip portion 430 is thereby trapped between vertical wall 428 and the shaft of bolt 446 to prevent any forward-backward sliding motion of tow hook 424 relative to the hitch assembly. If desired, a second connecting bolt, shown in dashed outline and designated by reference numeral 448, may be provided for being received within threaded hole 452. Ideally, the shaft of second bolt 448 is positioned to engage against the rear wall 425 of tow hook 424 to further minimize any forward-backward sliding movement of the hitch assembly relative to tow hook 424. It will be noted that, in this embodiment, there is no projecting boss, or any other form of insert, apart from one or more connecting bolts, that extends into the inner passage of the tow hook.

FIGS. 28 and 29 illustrate the extension of the attachment concept just described (relative to FIGS. 26 and 27) to a hitch assembly adapted to engage two tow hooks. Frame member 460 includes horizontal wall 462 and a front vertical wall 464. Clamp plate 466 is positioned against tow hook 468. Connecting-bolt 470 extends through aperture 472 in clamp plate 466 for being received within threaded hole 474 of horizontal wall 462, thereby clamping tow hook 468 against the inner face of horizontal wall 462. The external periphery of rounded tip portion 476 of tow hook 468 abuts the inner face of front wall 464, and the inner periphery of rounded tip portion 476 is engaged by the shaft of bolt 470. Front edge 478 of clamp plate 466 engages the inner face of front wall 464, and side edge 480 of clamp plate 466 engages the inner face of end wall 482. The inner face of end wall 482 also preferably engages one side of tow hook 468. Once again, a second connecting bolt 484 may be provided, along with a second threaded hole 486 to more reliably secure the assembly together. The shaft of second bolt 484, may, if desired, be positioned to abut rear wall 488 of tow hook 468.

FIG. 30 illustrates the manner in which two single-hook hitch assemblies may be used, in conjunction with two tow hooks, to support a cross member therefrom. In FIG. 30, tow hooks 500 and 502 represent left and right tow hooks attached to the front portion of a vehicle (not shown). Hitch assemblies 504 and 506 may be of the general type described in FIGS. 1-3, FIGS. 7-8, FIGS. 20-22, or FIGS. 26-27, for example. As shown, hitch assembly 504 includes receiver tube 508, and hitch assembly 506 includes receiver tube 510. Cross member 512 extends between opposing ends 514 and 516. End 514 includes a lateral square channel tube 518 adapted to be received within, and releasably secured to, receiver tube 508. Likewise, end 516 includes a lateral square channel tube 520 adapted to be received within, and releasably secured to, receiver tube 510. As shown, cross member 512 may itself include a central receiver tube 522 for receiving a towing hitch ball or other accessories. Moreover, the ends 514 and 516 of cross member 512 may themselves include forwardly projecting receiver tubes 524 and 526, respectively, for receiving additional accessory items. While FIG. 30 illustrates a cross member 512 interconnecting receiver tubes 508 and 510, those skilled in the art will appreciate that two separate accessory items may, if desired, be received independently, and simultaneously, by receiver tubes 508 and 510.

FIG. 31 illustrates a further embodiment of a clamping mechanism suited to engage a closed-loop, tear-drop shaped (or horse shoe shaped) tow hook. In FIG. 31, closed-loop, tear-drop shaped tow hook 530 is shown in dashed outline Hook 530 includes a rounded tip portion 532 connected by a pair of angled sides 534 and 536 to a rear connector 538. The clamp mechanism shown in FIG. 31 includes a lower clamp plate 540 and an upper clamp plate 542. Lower clamp plate 540 engages the lower face of hook 530, and upper clamp plate 542 includes a horizontal plate 544 that engages the upper face of hook 530. Lower plate 540 includes a pair of opposing generally-vertical side walls 546 and 548, which are angled to match the angular orientation of hook sides 534 and 536. Connecting bolt 550 is adapted to extend upwardly through hole 552 in plate 540, through the inner passage of hook 530, and into threaded hole 554 of plate 544. As shown in FIG. 31, threaded hole 554 is formed by first drilling an oversized hole in plate 544 of a size greater than threaded hole 554, and then welding a hex nut 556 to the top of plate 544 aligned with the original oversized hole. After bolt 550 is tightened, front wall 558 of upper clamp 542 engages the rounded tip 532 of hook 530; the lower portion of front wall 558 also abuts forwardmost edge 560 of lower plate 540. Sidewalls 546 and 548 engage the outer periphery of angled sides 534 and 536 of hook 530, and hook 530 is clamped between plates 540 and 544. A tow bar bracket, receiver tube, or other accessory receiving element (not shown) may be secured to either lower clamp plate 540 or upper clamp plate 542, if desired.

FIG. 32 shows a further embodiment of a clamping mechanism for being secured over a J-shaped open tow hook 560. Upper clamp member 562 includes a horizontal plate 564 positioned above the upper face of tow hook 560. Lower clamp member 566 includes a horizontal plate 568 positioned below the lower face of tow hook 560. Upper clamp member 562 includes a generally-vertical front wall 570, the inner face of which abuts the external periphery of the rounded tip portion 572 of hook 560. Lower clamp member 566 includes a partial, generally-vertical rear wall 574 that includes a gap 576 for allowing hook 560 to extend therethrough. In addition, a pair of side walls 578 and 580 extend generally-vertically upward from plate 568 on opposing sides thereof, and generally perpendicular to rear wall 574. Side walls 578 and 580 are spaced apart from each other by the width of hook 560.

Still referring to FIG. 32, a first connecting bolt 582 extends upwardly through plate 568, and through the inner passage of hook 560, to mate with threaded hole 584. If desired, a second connecting bolt 586 may be provided, along with mating threaded hole 588. Once the connecting bolts are tightened, rounded tip 572 of hook 560 is engaged with the inner face of front wall 570, and the lower portion of front wall 570 is also engaged with front edge 590 of plate 568; alternatively, front wall 570 extends within and between the frontmost portions of side walls 578 and 580, with the opposing side edges 594 and 596 engaging the inner faces of side walls 578 and 580, respectively. The opposing sides of hook 560 are engaged by the inner faces of side walls 578 and 580, and the inwardly-turned end 598 of hook 560 is engaged with the inner face of rear wall 574. Hook 560 is firmly clamped between the underside of plate 564 and the upper side of plate 568, and the various points of engagement between hook 560 and the clamp assembly prevent any rotational or lateral movement between hook 560 and the clamp assembly. As in the case of the clamp structure described above relative to FIG. 31, a tow bar bracket, receiver tube, or other accessory receiving element (not shown) may be secured to either lower clamp member 566 or upper clamp member 562, if desired.

Those skilled in the art will now appreciate that an improved tow hitch assembly has been described. The tow hitch assembly is securely mounted to one or both of the vehicle tow hooks by effectively clamping the tow hook between upper and lower frame plates. This configuration provides for a sturdy mounting to the tow hook, as the hook engagement member prevents pivotal movement of the hitch assembly relative to the tow hook. The assembly may be used with a variety of different tow hooks including "U" and "J"-shaped hooks. Additionally, the assembly is easy to install, and may be used with one or both hooks of a vehicle. Various modifications and changes may be made to the described embodiment by those skilled in the art without departing from the true spirit and scope of the invention as defined by the appended claims.

I claim:

1. A hitch assembly for attachment to first and second tow hooks of a vehicle, the first and second tow hooks being spaced apart from each other by a predetermined distance, each of the first and second tow hooks defining a hollow inner passage, said hitch assembly comprising:
   a. an elongated frame member extending between opposing first and second ends along a longitudinal axis, the elongated frame member having a length commensurate with said predetermined distance, the first end engaging the first tow hook and the second end engaging the second tow hook, the elongated frame member including a generally horizontal wall extending along the longitudinal axis and at least one generally vertical wall extending along the longitudinal axis and joined to said horizontal wall, said horizontal wall providing a first clamp surface proximate the first end of the elongated frame member and providing a second clamp surface proximate the second end of the elongated frame member;
   b. a first clamp member disposed proximate the first tow hook opposite the first clamp surface of the elongated frame member, the first clamp member and the first clamp surface of the elongated frame member being disposed on opposing sides of the first tow hook;
   c. a second clamp member disposed proximate the second tow hook opposite the second clamp surface of the elongated frame member, the second clamp member and the second clamp surface of the elongated frame member being disposed on opposing sides of the second tow hook;
   d. a first bolt extending through the hollow inner passage for the first tow hook for clamping the first tow hook between the first clamp surface of the elongated frame member and the first clamp member;
   e. a second bolt extending through the hollow inner passage of the second tow hook for clamping the second tow hook between the second clamp surface of the elongated frame member and the second clamp member;
   f. a first end cap secured to the first end of said elongated frame member and extending generally perpendicular to the first clamping surface, and extending at a substantial angle relative to the longitudinal axis of the elongated frame member;
   g. a second end cap secured to the second end of said elongated frame member and extending generally perpendicular to the second clamping surface, and extending at a substantial angle relative to the longitudinal axis of the elongated frame member;
   h. said first clamp member abutting both said first end cap and said at least one generally vertical wall to restrict rotational and lateral movement of said first clamp member relative to said elongated frame member; and
   i. said second clamp member abutting both said second end cap and said at least one generally vertical wall to restrict rotational and lateral movement of said second clamp member relative to said elongated frame member.

2. A hitch assembly for attachment to first and second tow hooks of a vehicle, the first and second tow hooks being spaced apart from each other by a predetermined distance, each of the first and second tow hooks defining a hollow inner passage, said hitch assembly comprising:
  a. an elongated frame member extending between opposing first and second ends along a longitudinal axis, the elongated frame member having a length commensurate with said predetermined distance, the first end engaging the first tow hook and the second end engaging the second tow hook, the elongated frame member including a generally horizontal wall extending along the longitudinal axis and at least one generally vertical wall extending along the longitudinal axis and joined to said horizontal wall, said horizontal wall providing a first clamp surface proximate the first end of the elongated frame member and providing a second clamp surface proximate the second end of the elongated frame member;
  b. a first clamp member disposed proximate the first tow hook opposite the first clamp surface of the elongated frame member, the first clamp member and the first clamp surface of the elongated frame member being disposed on opposing sides of the first tow hook;
  c. a second clamp member disposed proximate the second tow hook opposite the second clamp surface of the elongated frame member, the second clamp member and the second clamp surface of the elongated frame member being disposed on opposing sides of the second tow hook;
  d. a first bolt extending through the hollow inner passage for the first tow hook for clamping the first tow hook between the first clamp surface of the elongated frame member and the first clamp member;
  e. a second bolt extending through the hollow inner passage of the second tow hook for clamping the second tow hook between the second clamp surface of the elongated frame member and the second clamp member;
  f. said first clamp surface provided at the first end of said elongated frame member includes a first threaded hole for receiving a threaded end of said first bolt to releasably clamp the first tow hook between said first clamp surface and said first clamp member; and
  g. said second clamp surface provided at the second end of said elongated frame member includes a second threaded hole for receiving a threaded end of said second bolt to releasably clamp the second tow hook between said second clamp surface and said second clamp member.

3. The hitch assembly recited by claim 2 wherein said first clamp surface includes a first non-threaded hole formed therein, and said second clamp surface includes a second non-threaded hole formed therein, said hitch assembly further including:
  a. a first nut with a threaded bore secured to said first clamp surface adjacent the non-threaded hole formed therein, and aligned therewith, to provide said first threaded hole; and
  b. a second nut with a threaded bore secured to said second clamp surface adjacent the non-threaded hole formed therein, and aligned therewith, to provide said second threaded hole.

4. A hitch assembly for coupling to a tow hook of a vehicle, the tow hook defining a hollow inner passage, the tow hook including a first face and an opposing second face, the tow hook including a generally rounded tip portion extending away from the vehicle, said hitch assembly comprising:
  a. a first clamp member including a generally horizontal first plate for engaging the first face of the tow hook, said first clamp member including first and second generally vertical walls generally facing each other and extending about opposing sides of the tow hook, each of said generally-vertical first and second walls extending from a rear end to a front end;
  b. a second clamp member including a generally horizontal second plate generally parallel to and facing the generally horizontal first plate for engaging the second face of the tow hook, the second clamp member including a generally vertical third wall extending proximate the rounded tip portion of the tow hook, the generally vertical third wall extending at a substantial angle to the first and second generally-vertical walls; and
  c. a first connecting bolt extending through the hollow inner passage of the tow hook, and extending at least partially through the generally horizontal first and second plates for clamping the tow hook between the generally horizontal plates of the first and second clamping members.

5. The hitch assembly recited by claim 4 wherein said first connecting bolt extends proximate to the rounded tip portion of the tow hook for maintaining the rounded tip portion of the tow hook between the generally vertical third wall of the second clamp member and the first connecting bolt, thereby minimizing front-to-rear movement of the tow hook relative to the first clamp member.

6. The hitch assembly recited by claim 4 wherein the generally horizontal second plate of said second clamp member includes a first threaded hole for receiving a threaded end of said first connecting bolt.

7. The hitch assembly recited by claim 6 wherein the generally horizontal second plate of said second clamp member includes a non-threaded hole formed therein, and further includes a nut with a threaded bore secured to said generally horizontal second plate adjacent the non-threaded hole, and aligned therewith, to provide said first threaded hole.

8. The hitch assembly recited by claim 4 including a second connecting bolt extending through the hollow inner passage of the tow hook, and extending at least partially through the generally horizontal first and second plates for clamping the tow hook between the generally horizontal plates of the first and second clamping members.

9. The hitch assembly recited by claim 8 wherein the generally horizontal second plate of said second clamp member includes a second threaded hole for receiving a threaded end of said second connecting bolt.

10. The hitch assembly recited by claim 8 wherein the hollow inner passage of the tow hook includes a rear inner wall opposite the generally rounded tip portion of the tow hook, and wherein the second connecting bolt extends proximate the rear inner wall of the hollow inner passage of the tow hook.

11. The hitch assembly recited by claim 4 further including a pair of plates extending from the generally vertical third wall of said second clamp member, each of said pair of plates having a hole formed therethrough, the holes formed in each of such pair of plates being generally aligned with each other for receipt of the first end of a tow bar or the like.

12. The hitch assembly recited by claim 4 further including a receiver tube extending said second clamp member.

13. A hitch assembly for attachment to first and second tow hooks of a vehicle, the first and second tow hooks being spaced apart from each other by a predetermined distance, each of the first and second tow hooks defining a hollow inner passage and having first and second opposing faces, each of said tow hooks having generally rounded tip portion of the tow hook extending away from the vehicle, said hitch assembly comprising:

a. an elongated frame member extending between opposing first and second ends along a longitudinal axis, the elongated frame member having a length commensurate with said predetermined distance, the first end engaging the first tow hook and the second end engaging the second tow hook, the first end of the elongated frame member including a generally-horizontal plate for engaging the first face of the first tow hook, a first generally-vertical wall extending from said horizontal plate generally perpendicular thereto, and a second generally-vertical wall extending from said horizontal plate generally perpendicular thereto and at a substantial angle to said first generally-vertical wall;

b. a clamp plate disposed proximate to the first tow hook opposite the generally-horizontal plate and proximate the second face of the first tow hook, said clamp plate including a hook-clamping surface generally parallel to facing the generally horizontal-plate of the elongated frame member for clamping the first tow hook therebetween, said clamp plate further including a third generally-vertical wall for engaging the first generally-vertical wall of said horizontal plate, and said clamp plate including a fourth generally-vertical wall for engaging the second generally-vertical wall of said horizontal plate; and c. a first attachment bolt extending through the hollow inner passage of the first tow hook, and extending at least partially through the generally-horizontal plate and the clamp plate, for clamping the first tow hook between the horizontal plate and the clamp plate, with the third generally-vertical wall of the clamp plate engaging the first generally-vertical wall of said horizontal plate, and with the fourth generally-vertical wall of the clamp plate engaging the second generally-vertical wall of the horizontal plate, the first attachment bolt extending proximate the rounded tip portion of the first tow hook for maintaining the rounded tip portion of the first tow hook between the generally-vertical third wall of the clamp member and the first attachment bolt, thereby minimizing front-to-rear movement of the first tow hook relative to the generally-horizontal plate and the clamp member.

14. The hitch assembly recited by claim 13 wherein the generally-horizontal plate at the first end of the elongated frame member includes a first threaded hole for receiving a threaded end of said first attachment bolt.

15. The hitch assembly recited by claim 14 including a second attachment bolt extending through the hollow inner passage of the tow hook, and extending at least partially through the clamp member and the generally-horizontal plate at the first end of the elongated frame member for clamping the first tow hook between the generally-horizontal plate and the clamp member.

16. The hitch assembly recited by claim 15 wherein the generally-horizontal plate at the first end of the elongated frame member includes a second threaded hole for receiving a threaded end of said second attachment bolt.

17. The hitch assembly recited by claim 15 wherein the hollow inner passage of the first tow hook includes a rear inner wall opposite the generally rounded tip portion of the first tow hook, and wherein the second attachment bolt extends proximate the rear inner wall of the hollow inner passage of the first tow hook, thereby minimizing front-to-rear movement of the first tow hook relative to the generally-horizontal plate and the clamp member.

18. The hitch assembly recited by claim 13 further including at least one receiver tube extending from said elongated frame member.

19. A hitch assembly for attachment to a tow hook of a vehicle, the tow hook defining a hollow inner passage, said hitch assembly comprising:

a. a first clamp member disposed proximate the tow hook and providing a first clamp surface facing the tow hook;

b. a second clamp member disposed proximate the tow hook and providing a second clamp surface facing the tow hook opposite the first clamp surface of the first clamp member, the first clamp member and the second clamp member being disposed on opposing sides of the tow hook;

c. a bolt extending through the hollow inner passage of the tow hook and engaging the first and second clamp members for clamping the tow hook between the first clamp surface and the second clamp surface;

d. said first clamp surface provided including a first threaded hole for receiving a threaded end of the bolt to releasably clamp the tow hook between the first clamp surface and the second clamp surface.

20. A hitch assembly for attachment to a tow hook of a vehicle, the tow hook defining a hollow inner passage and having first and second opposing faces, the tow hook having a generally rounded tip portion extending away from the vehicle, said hitch assembly comprising:

a. a first clamp member having a generally-horizontal plate for engaging the first face of the tow hook, a first generally-vertical wall extending from said horizontal plate generally perpendicular thereto, and a second generally-vertical wall extending from said horizontal plate generally perpendicular thereto and at a substantial angle to said first generally-vertical wall;

b. a clamp plate disposed proximate to the first tow hook opposite the generally horizontal plate and proximate the second face of the first tow hook, said clamp plate including a hook-clamping surface generally parallel to and facing the generally horizontal-plate of the first clamp member for clamping the tow hook therebetween, said clamp plate further including a third generally-vertical wall for engaging the first generally-vertical wall of said horizontal plate, and said clamp plate including a fourth generally-vertical wall for engaging the second generally-vertical wall of said horizontal plate; and c. an attachment bolt extending through the hollow inner passage of the tow hook, and extending at least partially through the generally-horizontal plate and the clamp plate, for clamping the first tow hook between the horizontal plate and the clamp plate, with the third generally-vertical wall of the clamp plate engaging the first generally-vertical wall of said horizontal plate, and with the fourth generally-vertical wall of the clamp plate engaging the second generally-vertical wall of the horizontal plate, the attachment bolt extending proximate the rounded tip portion of the tow hook for maintaining the rounded tip portion of the tow hook between the generally-vertical third wall of the clamp member and the attachment bolt, thereby minimizing front-to-rear movement of the tow hook relative to the generally-horizontal plate and the first clamp member.

* * * * *